United States Patent [19]

Sweeney

[11] E Re. 30,038

[45] Reissued Jun. 26, 1979

[54] AQUACULTURE SYSTEM

[76] Inventor: Maxwell P. Sweeney, 1817 Fanning St., Los Angeles, Calif. 90026

[21] Appl. No.: 847,322

[22] Filed: Oct. 31, 1977

Related U.S. Patent Documents

Reissue of:

[64] Patent No.: 3,916,832
Issued: Nov. 4, 1975
Appl. No.: 351,545
Filed: Apr. 16, 1973

[51] Int. Cl.[2] ..... A01K 61/00

[52] U.S. Cl. ..... 119/2; 119/3; 119/4

[58] Field of Search ..... 119/2, 3, 4

[56] References Cited

U.S. PATENT DOCUMENTS

| | | | |
|---|---|---|---|
| 3,017,857 | 1/1962 | Munz | 119/4 |
| 3,158,135 | 11/1964 | Kimmerle | 119/3 |
| 3,473,509 | 10/1969 | Miyamura | 119/2 |
| 3,477,406 | 11/1969 | Fujinaga | 119/2 |
| 3,495,572 | 2/1970 | Groves | 119/3 |
| 3,601,094 | 8/1971 | Kittaka | 119/2 |

*Primary Examiner*—Hugh R. Chamblee
*Attorney, Agent, or Firm*—Albert L. Gabriel

[57] ABSTRACT

Method and apparatus for the aquaculture of aquatic, non-air breathing, carnivorous animals, wherein a generally enclosed body of water is established, and aquatic non-air breathing, carnivorous species to be reared is disposed in said body of water, a filter-feeding aquatic non-air breathing species is also disposed in said body of water, and an aqueous euphotic zone containing phytoplankton is established in said body of water; the excreta from said carnivorous and filter-feeding species providing nutrients to said phytoplankton, said phytoplankton at least in part providing the food for said filter-feeding species, and said filter-feeding species at least in part providing the food for said carnivorous species.

The water in said enclosed body is circulated so as to move water from below said euphotic zone to within said euphotic zone so that settling nutrients and phytoplankton are returned to the euphotic zone for maximum photosynthetic production of protoplasm in the system, and to avoid eutrophication in the lower levels of the body of water resulting from phytoplankton death and bacterial action on the nutrients. Such circulation may, according to the invention, be provided by energy from sea water, either from its higher specific gravity than fresh or brackish water, or from tidal action, or both.

Sea water is utilized according to the present invention in combination with fresh water to provide brackish water at least in said euphotic zone for optimum growth conditions of all three principal life forms, the phytoplankton, the filter-feeding species, and the carnivorous species. A fresh water lens or blanket may be spread over the top of the more dense brackish water during the cold season to provide a "greenhouse effect" maintaining the body of water within the desired temperature range for the growth cycle of the system.

33 Claims, 17 Drawing Figures

11.4%
11.7%

AQUACULTURE SYSTEM

Matter enclosed in heavy brackets [ ] appears in the original patent but forms no part of this reissue specification; matter printed in italics indicates the additions made by reissue.

BACKGROUND OF THE INVENTION

"Aquaculture" may be generally defined as the provision of favorable conditions for the growth of useful aquatic animals. Aquaculture has been practiced for thousands of years; thus, the first recorded instance thereof was the raising of carp in China in the year 1100 B.C., approximately 3,000 years ago. These fish were raised in ponds, and from that time until comparatively modern times, there was little change in the techniques applied to production, the ponds being generally small and productivity being limited to whatever fish food became available through the natural plant-type growth of each pond. Aquaculture of this general type has been greatly improved in recent years through fertilization of pounds, feeding of pelleted food concentrates, and in general a better understanding through research of fish requirements and problems.

Such "pond" type aquaculture has heretofore been mainly used in the rearing of herbivorous fish, such as tilapia, clarias, milkfish, mullet, and carp, all of which feed to a large extent directly on phytoplankton. It is conventional practice in this type of aquaculture to depend upon natural processes for rejuvenation of the water; i.e., the photosynthetic activity of phytoplankton is relied upon for regenerating nutrients and oxygen.

While herbivorous fish rearing is by far the present largest aggregate commercial aquaculture operation, nevertheless there is a large and increasing demand for a variety of aquatic non-air breathing carnivorous animals, such as several species of salmon, trout, shrimp, spiny lobster, and others. Such carnivorous species are, in general, considered to be much more of a delicacy in most places throughout the world than the herbivorous species, and are therefore highly desirable from a commercial standpoint because of a large demand and generally much higher prices that consumers are willing to pay therefor. Because of such commercial desirability, and because of the relatively low and seasonal availability of such carnivorous species from the fishing industry, there is a rapidly increasing current trend toward the aquaculture of a variety of carnivorous species. To a large extent the prior art endeavors in the aquaculture of carnivorous species have relied upon the aquaculture techniques developed in the pond culturing of herbivorous species, with ration feeding of the carnivorous species. For example, trout farming in the U.S.A. generally involves pellet ration feeding in ponds and private lakes, with natural processes being depended upon for water rejuvenation without any control thereof. Similarly, many Danish and Norwegian trout farms involve trash fish feeding in ponds.

However, such present systems for rearing aquatic nonair breathing carnivorous animals face a continual and major hazard of a "vicious circle" of loss of DO (dissolved oxygen), which may be explained as follows:

These aquatic non-air breathing carnivorous animals obtain their oxygen from the relatively very small concentration thereof which will dissolve in water (approximately 6 to 11 perts per million depending on temperature and salinity). If for any of a variety of reasons, the DO content of the water decreases sustantially, the animals invariably stop or greatly reduce their intake of ration food.

The unconsumed ration food remaining in the rearing system is relatively quickly attacked by aerobic bacteria which are always present and multiply rapidly in the presence of such nutrients. These bacteria then proceed to substantially consume the DO. The DO loss problem is then further and quickly aggravated on the next feeding of ration food to the point where the carnivorous animals being reared either directly die from suffocation, or become weakened and thereby become susceptible to frequently present disease organisms.

Some of the reasons for such an initial drop in DO include the following: (1) crowding of the reared species, particularly in relation to their movement relative to the water; (2) water stagnation, particularly near the bottom where organic matter of all kinds tends to accumulate; (3) water stratification, caused for example by heating of the surface layers by sunlight, particularly with high concentrations of phytoplankton therein which absorb the light, thereby lowering the density of the surface layers relative to lower layers; (4) after bottom layers have become relatively deoxygenated through stratification, then a turnover or mixing of the body of water occurring, as for example by wind action; (5) prolonged decrease in phytoplankton activity (which normally restores DO as well as removing toxic animal wastes), which may occur upon a decrease in sunlight or temperature, or as a result of high Ph levels which cause unavailability of essential carbon dioxide; (6) actual die-off of phytoplankton caused by excessive temperature or sunlight; or (7) leftover food caused simply by overfeeding the carnivorous animals, which may easily occur through (a) a drop in temperature which reduces the digestive rate of such cold-blooded animals and therefore their ability to consume previously satisfactory ration quantities, (b) overestimation of the total weight of live animals in the system, since daily rations must be closely related, as a percentage, to total animal weight in the system, or (c) underestimation of the individual size of the animals in the system, since such animals consume more at smaller sizes relative to their weight.

Substantially all of the above effects are greatly aggravated at points below the euphotic zone (i.e., below the point at which phytoplankton receive sufficient light to be active). Thus, the DO loss hazard is particularly acute in the case of bottom-dwelling species such as shrimp or lobster. It is believed that this problem is a major explanation for the lack of success of several prior art commercial aquaculture ventures attempting to rear American shrimp species.

Accordingly, in such a prior art ration feed rearing system for carnivorous aquatic non-air breathing animals, the inverse relationship between the food remaining in the system and the DO produces what may be considered to be a "vicious circle", with catastrophic results to the animals being reared.

In order to guard against the vicious circle of DO loss, two methods are commonly practiced in the rearing of carnivorous aquatic non-air breathing animals, each of which has serious drawbacks and is often costly. One such method is to conduct the rearing in running water, as for example in net pens, cages, or raceways. This has the serious problems: (1) waste of nutrients, i.e., that large portion not directly converted to animal growth; and (2) pollution of the downstream environment. Second, by the pumping of air to depth into the water so as to directly increase the DO of the water. This has the problems of (1) risking nitrogen supersaturation effects on the animals (many such animals die at nitrogen supersaturations of more than 105 percent of saturation), and (2) while this procedure can restore oxygen to the system, it does not remove waste products, some of which, particularly ammonia which is excreted in large amounts by these carnivourous animals, are highly toxic to the animals.

In addition to the above hazard, there is an important general inverse effect of DO level on growth rate below about 15 PPM DO. Thus, even in running water systems, there is a substantial lowering of DO when practical rations of water to fish are utilized which causes a lessening of achievable growth rates of the fish.

SUMMARY OF THE INVENTION

In view of these and other problems in the art, it is a general object of the present invention to provide a novel method and apparatus for rearing aquatic non-air breathing carnivorous animals in a generally enclosed body of water, wherein the tremendous protein productive capacity of phytoplankton is utilized with maximum conversion efficiency in the production of the carnivorous species.

The huge capacity for protein productivity of phytoplankton is strikingly illustrated by comparison with some common agricultural products in the following figures compiled by the United States Department of Commerce:

| Protein Productivity Comparison-Pounds Per Acre Per Year | | | | | |
|---|---|---|---|---|---|
| Phytoplankton | 14,000 | Wheat | 269 | Milk | 90 |
| (Chlorella) | | Rye | 260 | Meat | 54 |
| Peanuts | 420 | Oats | 232 | | |
| Beans | 370 | Barley | 224 | | |
| Peas | 353 | | | | |

Another object of the invention is to provide a novel system for rearing aquatic non-air breathing carnivorous animals wherein the capacity of phytoplankton for regenerating a body of water is effectively utilized, including the abilities of phytoplankton to regenerate dissolved oxygen and to reconvert animal animal waste products to usable protoplasm.

Another object of the invention is a provide a novel system for rearing aquatic non-air breathing carnivorous animals in a generally enclosed body of water, wherein these capabilities of phytoplankton are utilized through the use of an intermediate filter-feeding species which feeds on the phytoplankton and which in turn is fed upon by the carnivorous species.

Another general object of the invention is to provide a system of the character described wherein the the water in the enclosed body thereof is circulated so as to define a nutrient trap, the water being moved from below the euphotic zone to within the euphotic zone in an upwelling movement in which phytoplankton, fecal pellets from the animals, and other nutrient materials which tend to fall to the bottom of the body of water are returned to the euphotic zone for conversion to protoplasm by active phytoplankton, thereby recovering and coverting substantially all waste products back into protoplasm. By this means, substantially all of the nutrients that are placed in the system are retained therein, whereby the dry weight of the production carnivorous species can approach that of the feed added to the system.

Another object of the invention is to provide a system of the character described which is "fail safe" in maintaining dissolved oxygen levels. Maintenance of a maximum of oxygen in the system is assured both by the circulation which moves falling phytoplankton and nutrients back into the euphotic zone so as to avoid eutrophication thereof, and also in particular by the novel combination of phytoplankton, filter-feeding species which feed upon the phytoplankton, and carnivorous species which in turn feed upon the filter-feeding species. Thus, in the system, oxygen is generated by the phytoplankton in exact proportion to the requirements in the nutrient trap; i.e., consumption of protoplasm and oxygen by the combination of filter-feeding species and carnivorous species is balanced by production of protoplasm and oxygen by the phytoplankton; and in addition to this, dissolved oxygen from the air, which is applied through input waters and at times through the surface of the body of water, provides an excess of the required oxygen.

Further stabilization of the DO level will be automatically provided in embodiments of the invention wherein the carnivorous species at least in substantial part feeds directly upon an active living filter-feeding species, sometimes herein referred to as a forage species, which in turn feeds at least in substantial part on phytoplankton. This feeding sequence itself lends stability to the DO level and tends to assure the "fail safe" nature of the system. Thus, if for any reason the DO level starts to drop to the point where the carnivorous species ceases to feed, instead of unconsumed feed rapidly accummulating, the live forage species is simply not consumed, and it remains alive instead of becoming an object of rapid bacterial decay. Also, when feeding is reduced, so are excreted products upon which bacteria can feed. Furthermore, since it requires a somewhat lower DO for passive feeding of ration food than active pursuit of a live species, some ration food can still be added to the system without the "vicious circle" effect.

Another factor contributing to the stable DO level is that the standing biomass of the phytoplankton is very small compared to the biomass of the forage fish—on the order of only about 1 percent. As a consequence, there is always room in the phytoplankton population for immediate growth from the excretions of the forage fish, and such excretions do not cause any reduction in the oxygen level.

Another object of the invention is to provide a novel aquaculture system of the character described for rearing carnivorous non-air breathing aquatic animals, which is uniquely adaptable for use in a variety of climatic conditions, as for example in either temperature climates or tropical climates. Thus, for example, the system is useful in temperature zones for production of such carnivorous animals as Atlantic salmon, and in this regard it is preferred to utilize one or more lakes proximate seashore areas wherein sea water is readily available for use in the system. On the other hand, the system is equally adaptable for rearing such tropical species as shrimp and spiny lobster, and for such production it is convenient to utilize bodies of water enclosed in atolls.

Another object of the invention is to provide a system of the character described wherein sea water is utilized in combination with fresh water to provide brackish water at least in the euphotic zone for substantially optimum growth conditions of all three principal life forms in the system, the phytoplankton, the filter-feeding or forage species, and the carnivorous species. In forms of the invention wherein the body of water is a lake somewhat displaced above sea level, specific gravity energy of the sea water provided to the lake to form the brackish water may, at least in part, be used for stirring or circulating the body of water. On the other hand, in the embodiments of the invention wherein the body of water is proximate sea level, tidal action of the sea water may be employed for stirring or circulating the body of water. In either case, such circulation keeps the bottom region of the body of water from going anoxic, even though phytoplankton may be highly concentrated in the euphotic zone.

Another object of the invention is to provide novel means for maintaining the body of water, and in particular the euphotic zone therein, within an optimum temperature range for the growth cycles of the system during the cold season when temperatures otherwise would be likely to go so low as to virtually halt the growth cycle, and in particular the growth of the production carnivorous species. This novel means for controlling temperature comprises a fresh water lens or blanket which is spread over the top of the body of brackish water so as to provide a "greenhouse" effect that maintains the body of water within the desired temperature range. This fresh water blanket is enabled to be supported as a discrete upper insulative layer because of its substantially lower specific gravity than that of the brackish layer immediately therebelow.

Another object of the invention is to provide, in a system of the character described, a novel combination of a primary enclosed body of water within which the rearing occurs, and a secondary enclosed body of water in the form of a forebay to the primary body of water. The sea water for the primary body enters the forebay, preferably by tidal pumping action, and moves as a lower layer the length of the forebay, from which it is extracted and passed to the primary body of water. The brackish water outlet from the primary body flows in the opposite direction as an upper layer across the forebay. In this manner, the forebay provides an even greater nutrient trap effect, nutrient products leaving the primary body of water with the brackish water outflow settling into the loser, sea water layer in the forebay to be recovered and pumped back into the primary body of water. Additionally, new nutrient products forming in the upper, brackish level of the forebay will fall down into its sea water level, to be recovered and provided to the primary body of water; and of course any nutrients entering with the sea water also are provided to the primary body.

The fresh water lens or blanket coming off of the primary body of water in the cold season may also be spread over this secondary, forebay body of water so as to preheat the sea water entering through the forebay, and to maximize nutrient conversion to protoplasm production in the forebay.

Further objects and advantages of the present invention will appear during the course of the following part of the specification, wherein the details of construction, mode of operation, and novel method steps of presently preferred embodiments are described with reference to the accompanying drawings, in which:

DETAILED DESCRIPTION

Lake or Pond Embodiment

Figures 1, 2, 3, 4, 5:
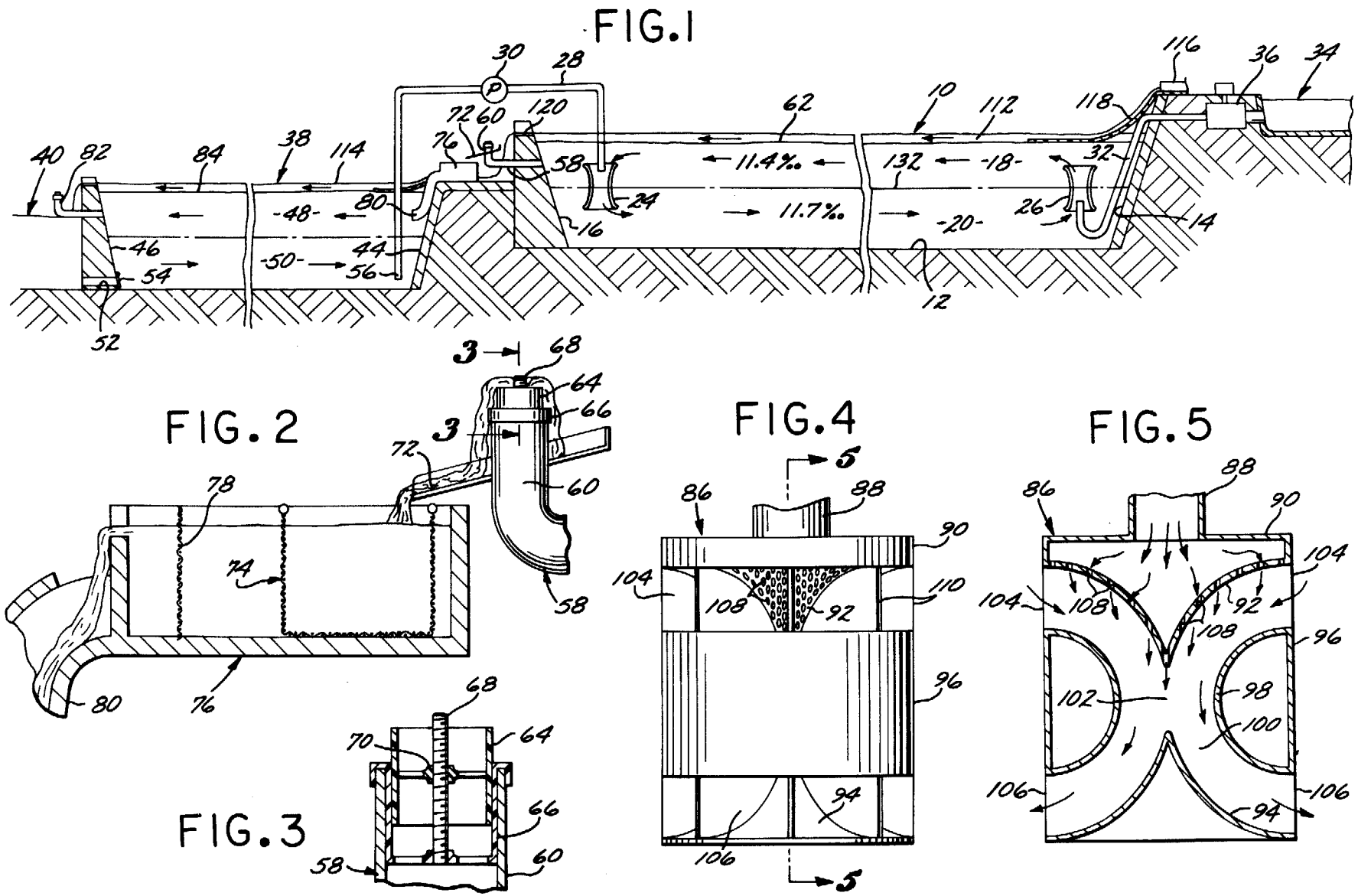
FIG. 1 is a diagrammatic view in longitudinal, vertical section, with portions in elevation, illustrating one form of the present invention having a primary enclosed body of water displaced somewhat above sea level, and a secondary, forebay body of water proximate sea level.
FIG. 2 is an enlarged, fragmentary vertical section, partly in elevation, illustrating outlet structure for the primary body of water and inlet structure for the forebay.
FIG. 3 is a further, enlarged, fragmentary vertical section taken on the line 3—3 illustrating vertical adjustment means in the brackish water outlet from the primary enclosed body of water, permitting adjustment of the outflow height of the brackish water relative to the outflow height of the fresh water lens or blanket, and thereby permitting control of the thickness of the fresh water lens.
FIG. 4 is a side elevational view of a suitable mixing chimney employable in the invention for mixing sea water with brackish water, and inverted for mixing fresh water with brackish water, for creating and maintaining discrete layers of different salinities in the primary body of water, and for causing the desired circulation in such layers.
FIG. 5 is a vertical, axial section taken on the line 5—5 in FIG. 4.

FIGS. 1 to 5 illustrate a structural arrangement that is suitable for rearing a carnivorous species according to the invention, wherein the primary body of water generally designated 10 is a lake or pond preferably located near an ocean for availability of sea water. The primary body 10 of water is preferably located relatively close to sea level in elevation, as for example within about 100 feet above sea level, to minimize the expenditure of power in pumping sea water to the primary body 10 of water.

The primary body 10 of water as illustrated is in the form of a lake or pond having a bottom 12, an upstream end defined by a wall 14 and a downstream end defined by a dam 16. The primary body 10 of water consists of three discrete layers or zones extending generally the length of the lake, including (1) a euphotic layer or zone 18, which is an upper brackish water layer, (2) a bottom layer or zone 20 constituting a lower brackish water layer which lies beneath the euphotic layer 18, and (3) a covering layer 22 of fresh water which constitutes an insulative lens or blanket over the euphotic layer 18.

In the form of the invention illustrated in FIG. 1, the discrete euphotic and bottom layers 18 and 20, respectively, are established, and oppositely directed flows therein are also established, by utilization of a generally vertically oriented mixing chimney 24 proximate the downstream end of the body 10 of water for introducing sea water into the body 10; and by utilization of a further generally vertically oriented mixing chimney 26 proximate the upstream end of the body 10 for introducing fresh water into the body 10.

Sea water is pumped in through a conduit 28 by pump 30 so that the incoming sea water flows downwardly through the downstream chimney 24, the downflowing sea water drawing brackish water from the euphotic zone 18 into the mixing chimney 24 to provide an outflow form chimney 24 in the bottom zone 20 of brackish water having a somewhat higher salinity than the brackish water that was introduced in the chimney 24 from euphotic zone 18. Additionally, this downflow of sea water and brackish water in the downstream chimney 24 causes a generally downstream direction of flow of the brackish water in euphotic zone 18, and a generally upstream direction of flow of the brackish water in the bottom zone 20.

In a similar manner, fresh water is introduced into the primary body 10 of water through a conduit 30 entering the upstream mixing chimney 26 from the bottom so as to cause an upflowing circulation in the mixing chimney 26 which draws brackish water upwardly from the bottom zone 20, mixes it with the fresh water, and dispenses it in the euphotic layer 18 as brackish water of somewhat lesser salinity than the brackish water in the lower zone 20. This upflowing through the upstream chimney 26 also causes upstream movement of the brackish water in the bottom zone 20 and downstream movement of the brackish water in the euphotic zone 18.

Because the salinity in the upper brackish water layer 18 is somewhat less than the salinity in the lower brackish water layer 20, the density or specific gravity of the upper brackish layer 18 will be slightly less than the density or specific gravity of the lower brackish water layer 20, whereby the upper layer 18 will rest as a discrete layer on top of the lower layer 20.

Summarizing the manner in which the discrete upper and lower brackish layers 18 and 20 are established, downflowing sea water into the chimney 24 at the downstream end creates an increased salinity of the lower layer 20, and hence increased density thereof, and also causes an upstream flow direction of the lower layer 20 of brackish water; while at the same time upflowing fresh water in the upstream chimney creates a decreased salinity of the upper brackish layer 18 of lesser density than the lower brackish layer 20, and causes a downstream flow direction of the upper brackish layer 18.

The fresh water for mixing chimney 26 is preferably provided from one or more fry ponds 34 located upstream of, and preferably at a somewhat higher elevation than, the main body of water 10, and the rate of flow of fresh water from fry pond 34 to mixing chimney 26 may be controlled by suitable valve means 36 in the conduit 32.

It is preferred to employ a forebay or secondary enclosed body of water for cooperation with the primary body of water in the provision of sea water, and in overall nutrient trap efficiency. Such a forebay is generally designated 38 in FIG. 1, and is located between the primary body 10 and the ocean 40, proximate the sea level. Forebay 38 has a bottom 42 that is below the high tide level of ocean 40, an upstream end wall 44, and a dam 46 or other suitable enclosure separating the forebay 38 from ocean 40.

As with the main body 10 of water, the forebay 38 has discrete layers or zones of different salinity therein, including an upper saline layer or zone 48 of brackish water, and a lower saline layer or zone 50 of sea water. Sea water is pumped into the lower layer 50 by tidal action through a passage 52 through dam 46, the passage 52 having a check valve 54 therein. The sea water is extracted from the lower layer 50 proximate the upstream end of forebay 38 through a pick-up end 56 of the sea water conduit 28, the end 56 being located low in the lower layer 50. This introduction of sea water into the lower layer 50 of the forebay at the downstream end thereof and extraction of sea water from the upstream end thereof causes an upstream direction of movement of the entire lower saline layer or zone 50 in the forebay.

The brackish upper saline layer or zone 48 of the forebay is obtained from the brackish water outflow of the primary body 10 of water. Aside from evaporative effects, the brackish water outflow from primary body 10 will approximately equal the summation of the fresh water inlet thereto at the upstream end through conduit 32 and the sea water inlet thereto at the downstream end through conduit 28. The brackish water outlet is from the downstream end of the upper brackish water layer 18, downstream of the mixing chimney 24, at a region which is essentially a stagnation point in the flow system of the primary body of water 10; i.e., at a point displaced from the main region of downstream flow of upper brackish layer 18 and upstream flow of lower brackish layer 20 between the mixing chimneys 24 and 26, and accordingly in a region displaced from the main area where nutrients are generated in the upper layer 18 and fall down into the lower layer 20 so as to be moved back upstream in the lower layer 20 and thus retained in the primary body of water. Thus, the brackish water outlet from the main body 10 of water is a conduit 58 which extends through the dam 16, communicating at its upstream end with the upper brackish layer 18 at an intermediate level therein, and extending downstream through the dam 16 and turning upwardly in an elbow to provide an upstanding outlet portion 60. The upper end of this outlet portion 60 of conduit 58 determines the level of the upper boundary 62 of the upper brackish layer 18, and is provided with a vertically adjustable outlet as shown in detail in FIGS. 2 and 3 to permit adjustment of the vertical level of the upper boundary 62 of brackish layer 18 relative to the dam 16, which in turn enables the thickness of the covering fresh water blanket to be regulated as hereinafter described. Such vertical adjustment of the upstanding outlet portion 60 of conduit 58 may be provided by means of a telescoping sleeve 64 supported in a tubular carrier 66 that is seated in the upper end of portion 60 of the conduit 58. An axial, upstanding threaded shaft 68 is supported in the bottom of carrier 66, and an element 70 suspended in the telescoping sleeve 64 is threadedly engaged with the shaft 68, whereby the sleeve 64 may be telescopically moved up and down simply by rotation thereof.

An inclined trough or flume 72 extends under the outlet of conduit 58, catching the brackish water outlet therefrom and guiding it into a perforated brail basket 74 disposed under the lower lip of trough or flume 72. The brail basket 74 is thus arranged to catch any solid objects which may flow out of the main body of water 10. The brail basket 74 is removably mounted in a sump 76, the brackish water passing through a further screen member 78 in the sump for catching objects when the brail basket 74 is temporarily removed, and the brackish water then overflowing from the sump 76 into a conduit 80 which dispenses the brackish water into the upper, brackish water layer 48 of forebay 38. For this purpose, the outlet of conduit 80 is located substantially above the level of the sea water layer 50.

Brackish water outlet from the layer 48 of the forebay is provided by a conduit 82 extending through the dam 46 into communication with the layer 48, the conduit 82 being similar to the conduit 58 and preferably having a vertically adjustable outlet for adjustably establishing the upper boundary 84 of the brackish layer 48 in the forebay, and accordingly also permitting adjustment of the thickness of the fresh water blanket applied over the top of the forebay as described hereinafter.

With the brackish layer 48 of the forebay thus having its inlet at the upstream end of the forebay and its outlet at the downstream end of the forebay, flow is established in the upstream-to-downstream direction in the brackish layer 48, or countercurrent to the upstream direction of flow of the lower sea water layer 50.

FIGS. 4 and 5 illustrate structure of one suitable type of mixer, designated 86, which may be employed either singly or in parallel groupings for each of the mixing chimneys 24 and 26. The mixer 86 is a generally cylindrical structure having an inlet conduit 88 coming into an inlet plenum 90 at the top. Inlet plenum 90 is generally annular, having a lower wall 92 of generally conical but downwardly concaved configuration; and a similarly configured bottom wall 94 of the mixer is arranged in opposed or complementary relationship with respect to the wall 92. A ring or band 96 extends around the central part of the mixer, and has a curved annular inner wall 98 which cooperates with the aforesaid walls 92 and 94 to provide an annular cavity 100 that is generally in the configuration of the inner half of a torus with an openly communicating axial center portion 102. The mixer thus has a generally open annular flow inlet 104 in its upper portion, and a generally open annular flow outlet 106 in its lower portion. The generally downwardly directed flow channel between inlet 104 and outlet 106 is preferably of somewhat reduced cross section in the central region thereof to accelerate the rate of flow and reduce the pressure, thereby assisting inlet flow of water from the inlet plenum 90 through perforations 108 in the lower wall 92 thereof.

A series of vertical baffles 110 are radially arranged in the annular cavity 100 and regularly spaced thereabout, the baffles 110 serving as structural members of the mixer 86, and operating as flow straightening vanes.

Mixing chimneys like the mixer 86 are preferably provided in various heights according to the depth of the primary body of water 10 to be circulated thereby. The deeper the body of water, the greater the vertical extent of the mixer. In this manner, maximum advantage is taken of the circulation energy afforded by the difference in specific gravity between sea water and brackish water on the one hand, and between fresh water and brackish water on the other hand, as will be further described hereinafter.

The mixer 86 as illustrated in FIGS. 4 and 5, with inlet conduit 88 and plenum 90 located at the top, is arranged to be used as a chimney 24 for mixing sea water with brackish water, i.e., it is a downflow type of chimney. In this arrangement, sea water will be introduced into the inlet conduit 88 and plenum 90, flowing downwardly through the annular cavity 100 and drawing brackish water from the upper brackish layer 18 into the mixer at inlet 104, the sea water mixing with this inlet brackish water in the central part of the cavity 100 and increasing the salinity thereof, and then this mixed brackish water of increased salinity will flow out of outlet 106 into the lower brackish layer 20.

Conversely, if the mixer 86 is to be used as an upflow chimney 26 for mixing fresh water with brackish water, it will be inverted from the position shown in FIGS. 4 and 5, the fresh water entering the bottom through conduit 88 into plenum 90, and then flowing upwardly through perforations 108 into the mixing chamber formed by the annular cavity 100, drawing brackish water from the lower brackish layer 20 upwardly through the mixer and decreasing its salinity, the brackish water of decreased salinity flowing out into the upper brackish layer 18.

Referring again to FIG. 1, during the cold season it is desirable to establish a fresh water blanket or lens 112 over the top of the primary body 10 of water, and it is similarly desirable to establish a fresh water blanket or lens 114 over the body of water in the forebay 38. The fresh water for these insulative blankets 112 and 114 may be from a separate source than the fresh water mixed into the brackish layers as heretofore described, as for example from a supply conduit 116 at the upper end of body 10. Preferably, the fresh water from source 116 is gently flowed out over the upper boundary 62 of the upper brackish layer 18, as by suitable spreading means such as plastic sheet 118 that preferably has a specific gravity intermediate that of the layers 18 and 112. This fresh water blanket layer over the main body of water 10 flows in the downstream direction, remaining as a discrete layer which floats on top of the upper brackish layer 18 because of its lesser density, and flows out over a spillway 120 or the like at the top of dam 16. This fresh water then is similarly flowed out into the blanket layer 114 on top of brackish layer 48 in the forebay, flowing in the downstream direction and flowing out into the ocean over a suitable spillway in the dam 46.

It is desirable to adjust the thickness and consequently the insulative effect of the fresh water blanket layers 112 and 114 according to seasonal conditions, and generally to even completely eliminate this insulative layer during the warm weather season. Such adjustment of the blanket layer 112 over the main body 10 of water is accomplished as aforesaid by simply adjusting the height of the telescoping sleeve 64 in the brackish water outlet conduit 58. The vertical displacement of the top of sleeve 64 below the level of spillway 120 will determine the thickness of the blanket layer 112, the lower the sleeve 64, the thicker the blanket layer 112. When the sleeve 64 is raised to approximately the same level as spillway 120, or above such level, then the brackish water layer 18 will commence flowing over the spillway 120, and the fresh water blanket or lens 112 will be completely eliminated. It is desirable to adjust the flow of fresh water from source 116 according to the requirements in the blanket or lens 112, and this flow can be terminated upon elimination of the blanket layer if desired, so as to not interfere with the established salinity in the upper brackish layer 18.

The thickness of the fresh water blanket or lens 114 on the forebay is similarly adjusted or eliminated by vertical adjustment of the outlet conduit 82 at the downstream end of the forebay.

The Rearing of Atlantic Salmon

The present invention, and particularly various method steps thereof, will perhaps be best understood by describing detailed methods and procedures with reference to the production of several particular carnivorous species of aquatic non-air breathing animals. However, it is to be understood that such details with respect to production of specific species of carnivorous animals are set forth herein by way of example, and not of limitation, and that the invention is equally adaptable for the production of many other carnivorous aquatic non-air breathing animals.

Accordingly, detailed method steps and procedures, as well as preferred parameters, will now be set forth with respect to the rearing of Atlantic salmon in a temperate climatic zone, with reference to FIGS. 1 to 8 of the drawings. Atlantic salmon has been chosen as an example herein not only because the invention is well adapted to the production thereof, but also because a number of economic factors make Atlantic salmon particularly desirable from a commercial standpoint, including but not limited to the following factors: (1) there is a large, unfilled demand for Atlantic salmon in Europe and elsewhere in the world; (2) Atlantic salmon is considered a delicacy in Europe and elsewhere, and therefore brings a relatively high price; (3) the present invention is to efficient in converting feed to fish meat in the carnivorous animals that it is able to produce mature Atlantic salmon of optimum marketable weight (as for example about 8 pounds) considerably earlier than the natural growth cycle for this fish so that with the rearing cycle of the present invention Atlantic salmon is marketable as fresh salmon during the winter months when fresh salmon is normally not available from the fishing industry; (4) with the invention the product can be harvested when sold, so that there is no need to reduce profits by freezing or canning; (5) the system permits optimum growth of the product even in winter months when wild Atlantic salmon grow very little, so that Atlantic salmon can be produced in an area close to major marketplaces such as Europe without loss of efficiency because of adverse weather conditions.

Figure 8:
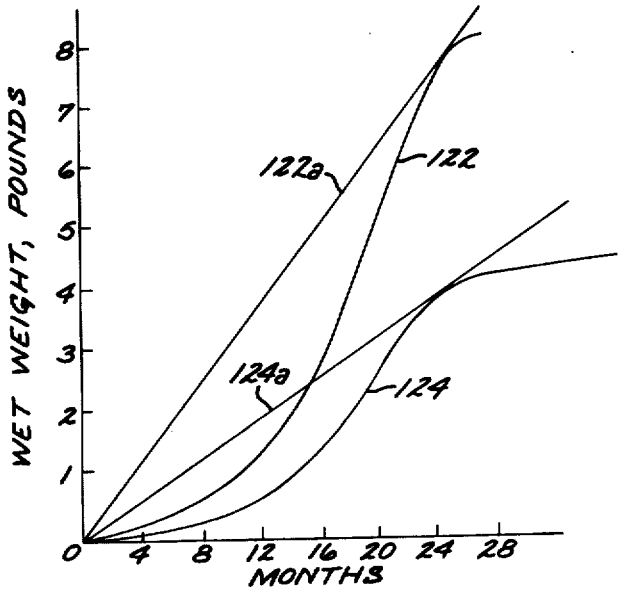
FIG. 8 is a further chart or graph showing a comparison between growth rates for carnivorous species of intrinsically different sizes, in this case a comparison between the growth rates of salmon and trout.

An interesting advantage in choosing Atlantic salmon for production as compared with a smaller but also very desirable carnivorous species such as trout is illustrated in FIG. 8. In this figure wet weight of the product in pounds is plotted against time in months from hatching, the curve 122 being typical for Atlantic salmon, while the curve 124 being typical for large species of trout. It will be noted tht absolute growth rate is relatively small in the early months for both species, and then during an adolescent period the growth rate is large, and that when adulthood is reached the growth rate tapers off. Asymptote lines 122a and 124a for the respective curves 122 and 124 indicate optimum harvest times. It will be apparent from FIG. 8 that even if the fish are being harvested at a relatively young age or small size for the ultimate size of the particular species, it is desirable to choose the intrinsically larger species, salmon, because of the much larger growth in a similar interval of time.

In its broad aspect, the invention contemplates the carnivorous species being reared feeding at least in part upon a filter-feeding species, which in turn feeds at least in part upon phytoplankton, all three of these life forms being embodied in a generally enclosed body of water. In the present illustration the generally enclosed body 10 of water as illustrated in FIG. 1 will therefore have the Atlantic salmon therein, will also have at least one species of filter-feeding animal therein, and will have phytoplankton growing in the euphotic zone 18 thereof.

It is preferred to selectively inoculate the euphotic zone 18 with desired species of phytoplankton, and in general a mixture of phytoplankton species will be better than a single species, as some species are best for amino acid production, while other species are best for such considerations as digestibility and size. It is to be noted in this regard that the younger forage animals will in general prefer larger species or aggregations of plankton.

The term "phytoplankton" as used herein refers to unicellular aquatic plants which may live as individual members, or as colonies (e.g., chain-forming diatoms or slime-forming algae), and which may float in the water or be attached to substrates.

The filter-feeding species

In selecting the filter-feeding or forage species, it is desirable that the ecological niches for phytoplankton feeding be substantially filled, preferably with species whose adults the growing salmon are capable of foraging on. Although a single forage species may be provided, it is preferable to have a combination of several forage species. Desirable forage species for Atlantic salmon are threadfin shad (Dorosoma petenense), stoneroller (Campostoma anomalum), and opossum shrimp (Mysis relicta or Neomysis awatschensis).

The threadfin shad is a small euryhaline clupeidae which is anadromous and therefore spawns in confined enclosures in the spring and fall. It is a midwater filter-feeder with a relatively large, highly evolved stomach, and therefore can directly feed on and digest phytoplankton. Dorosoma species appear to be a particularly desirable forage for salmon, and are considered to be remarkably free of disease. They will also feed on zooplankton, thereby keeping their numbers relatively low. This is important to avoid "ecological cannibalism," a phenomenon in wild systems wherein various sizes of zooplankton feed at least in part on each other and also larvae of the forage species, thereby greatly reducing productivity.

The threadfin shad may be started in the system as eggs (they spawn naturally on excelsior pads), and these will within one year be adult fish that will spawn.

Another Dorosoma species that is useful is the gizzard shad (Dorosoma cepedianum), which controls weeds.

The stoneroller is a small cyprinoid which prefers to build spawning "nests" on rocky bottoms—thus the name. Of all similar fish tested for the present purpose, it is the only one which could not be reared on an animal-based diet, thus indicating it is probably one of the few obligate plant-type feeders. The stoneroller appears to feed mainly on benthic algae in fairly shallow water. It also has a highly evolved stomach for efficient digestion of such algae.

Opossum shrimp are small mysid-type euryhaline shrimps adapted to cold water. They are negatively phototrophic, staying near the bottom except at night, and they feed on deep bottom organisms, including algae and zooplankton, and will scavenge organic detritus, thereby helping to prevent the deep bottom region from becoming deoxygenated. In the relatively warm water of the present rearing system, with adequate nutrients, opossum shrimp will spawn the year around at approximately 2-month intervals. The opossum shrimp will provide additional forage for the salmon, particularly young salmon, and are beneficial in salmon diets for color and flavor.

Another suitable forage fish is the pond smelt (Hypomesus olidus), which is a phytoplankton filter-feeder.

A still further filter-feeder which is desirable in the salmon rearing system is abalone (Haliotus discus or Rufescens). The relatively protected, abundant nutrient, moderate temperature conditions of the present rearing system are substantially ideal for this marine gastropod, at least in the forebay wherein the bottom is at sea water salinity. Including abalone in the salmon rearing system has several benefits. For one thing, abalone eat sea weed and kelp, and will therefore keep these cropped down in the forebay. Further, an adult female abalone releases on the order of about 10,000,000 eggs which become free swimming veligers for some time before settling to the bottom. In the present rearing system, all such veligers will both stay in the system and tend to be distributed throughout it, being pumped up into the primary body of water from the higher salinity water in the forebay. In the system at the preferred temperatures, it is expected that abalone spawning will take place in about October, and that the veliger stage will last for two to three weeks. This period will generally coincide with the period just after fall spawning of the threadfin shad, thereby supplying abundant microzooplankton to the shad fry during the one month period when its stomach is still developing and it prefers such zooplankton to phytoplankton. During the spring spawning period for the shad, the shad fry will find ordinary zooplankton abundant because of the natural zooplankton bloom in the late spring, both in the incoming sea water and within the rearing system itself.

It is particularly desirable to promote an abundant fall crop of shad fry, which will thus be assisted by the presence of abalone, for several reasons. First, it tends to greatly stabilize the shad population, since it will be at this period that the salmon will be of a size where they are consuming large quantities of adult shad, and generally ignoring small prey, which thereby ensures progeny. Further, it provides in the early spring post-fry juvenile shad for the relatively small yearling salmon to begin piscivorous feeding.

In the introduction of the various species in the system, precautions are preferably taken to minimize the possibility of introducing species-specific diseases and parasites. For example, all eggs (including salmon) introduced into the rearing system will preferably be disinfected, as for example with Wescodyne, which has very recently been shown to be effective not only against bacteria adhering to the eggs, but also against fungi and viruses. In the introduction of other than eggs, it is desirable to obtain certified stocks, to examine for disease and parasites prior to introduction into the system, and also to quarantine such stocks in isolation from the system for an appropriate period to ensure freedom from such pests.

Salinity

Figure 6:
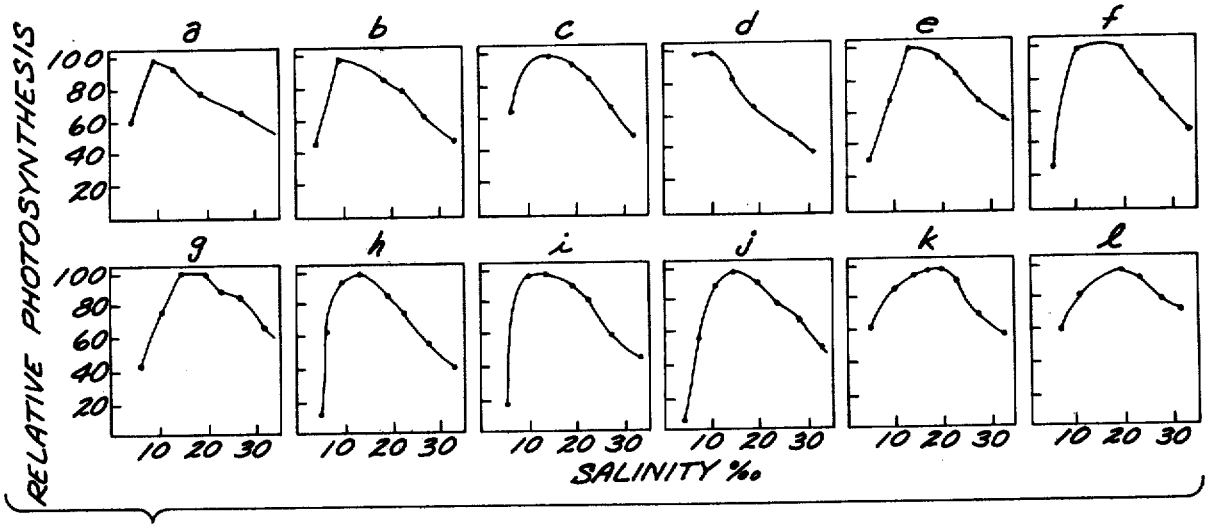
FIG. 6 is a diagram including twelve graphs for typical phytoplankton, each graph comprising a comparison between relative photosynthesis of a particular phytoplankton species and salinity in parts per thousand of a euphotic zone in which the phytoplankton are growing.
Figure 7:
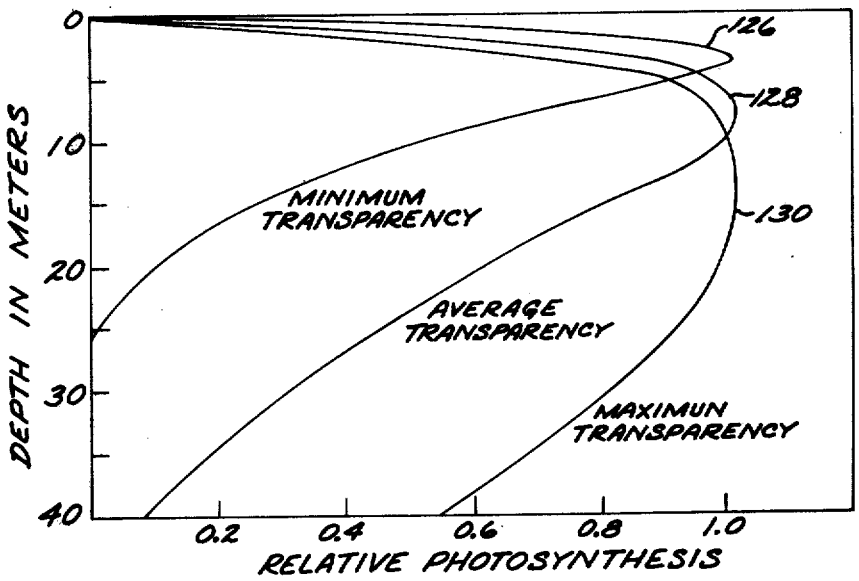
FIG. 7 is a further graph showing vertical distribution of photosynthesis for a homogeneously distributed population of phytoplankton in sea water, as an indication of desired depths for primary enclosed bodies of water employed in the invention.

While the intermediate salinity (between sea water and fresh water) of the brackish layers 18 and 20 is utilized in the system for a series of cooperative purposes, including provision of optimum growth conditions, circulation of the water and supporting of fresh water blanket or lens, nevertheless it is desirable to choose the particular salinites established for the best production of the carnivorous species, in this case the Atlantic salmon. Optimum salinity is that which is isotonic with the cellular fluids of the salmon, which is approximately 11.6 parts per thousand (hereinafter designated o/oo). By having the salinity of the brackish layers close to isotonic, osmotic balance energy requirements are virtually completely eliminated, and the salmon are able to resist stresses of all kinds much better, including diseases, heat, cold, and sexual maturation and functioning. As an example of the importance of optimum salinity, tests with other salmon species at isotonic salinity have indicated a growth rate up approximately 70% and a conversion efficiency of approximately 40% over fresh water rearing conditions. This optimum salinity for the salmon will also be close to optimum for forage species such as the threadfin shad, stoneroller, gizzard shad, and pond smelt. Such optimum salinity for the salmon is also close to optimum for photosynthetic production in typical phytoplankton, as illustrated in FIG. 6 for the phytoplankton (a) Nitschia closterium, (b) Asterionella japonica, (c) Biddulphia sinensis, (d) Ceratium furca, (e) Planktoniella sol, (f) Chaetoceros lorenzianus, (g) Rhizosolenia styliformis, (h) Dinophysis miles, (i) Triceratium favus, (j) Coscinodiscus radiatus, (k) Thalassiosira subtilis, and (l) Dichtyocha sp.

However, when the energy of relative salinity is utilized as in the system illustrated in FIG. 1 to produce circulation, the salinities of the brackish layers 18 and 20 will of course differ somewhat from optimum for the salmon. Nevertheless, this difference can be a relatively very small one, so that both of the layers or zones 18 and 20 will have salinities close to isotonic for the salmon. Thus, for example, suitable salinities for the zones 18 and 20 may be 11.4 o/oo and 11.7 o/oo, respectively. It is to be noted here that the salinities of the layers 18 and 20 may thus be chosen to be on opposite sides of the isotonic salinity for the salmon. The small difference of only 0.3 o/oo between layers 18 and 20 is sufficient to maintain good, discrete layering, and also to provide the desired pressure head for circulation as described more in detail hereinafter. The minimum o/oo differential between layers 18 and 20 is approximately 0.1 o/oo to maintain the discrete layering and for circulation and mixing purposes.

While it is thus desirable to have the salinity of brackish layers 18 and 20 close to isotonic for the carnivorous species, nevertheless a much lower than optimum salinity may be employed in the euphotic zone within the scope of the invention. Thus, the minimum o/oo in the euphotic zone 18 for satisfactory operation of the invention is about 3 o/oo saline content (o/oo is, of course, on a weight basis as used herein). This approximately 3 o/oo minimum for the euphotle zone is established by several different factors. First, as is clear from the graphs of FIG. 6, approximately 3 o/oo is a critical lower limit, on the average, for photosynthetic production in respresentative phytoplankton species. Second, 3 o/oo is about the lower limit for advantageous growth and conversion rates of both the carnivorous and filter-feeding species. Third, about 3 o/oo is required to assure that the fresh water blanket or lens 112 will be supported as a discrete layer on top of the upper brackish layer 18, under conditions in which the fresh water layer is of maximum density (approximately 4° C.).

Temperature

Maximum conversion efficiency for Atlantic salmon is at a temperature in the brackish layers 18 and 20 of approximately 12° C., and the preferred range for Atlantic salmon is within about 2° C. each side of this maximum conversion efficiency temperature, or a range of from about 10° C. to about 14° C. Nevertheless, good production results can be obtained with Atlantic salmon for a temperature range of the brackish layers of from about 8° C. to about 16° C., and the maximum practical range for Atlantic salmon appears to be from about 7° C. to about 17° C.

The optimum growth rate for Atlantic salmon is achieved at approximately 16° C. However, growth rate is not as important an economic factor as maximum conversion efficiency of feed, which takes place at approximately 12° C.; hence the preferred temperature range of from about 10° C. to about 14° C.

Maintaining the brackish water temperature within these desired temperature ranges, and if possible within the preferred range of about 10° C. to about 14° C., is important because of the profound influence that temperature has not only upon conversion efficiency, but upon such other important factors as digestion, metabolic rates, and dissolved oxygen levels at saturation in the water.

With the present rearing system located in a temperature climatic zone, as for example in one or more lakes located adjacent the west coast of Ireland, temperatures in the body of water will generally remain within the preferred temperature range of about 10° C. to 14° C. during the major part of the year. However, during the months of January through April the body of water is likely to drop below the preferred range unless compensated for by the fresh water blanket or lens covering of the present invention. The fresh water blanket or lens layer 112 not only enables the brackish zones 18 and 20 to be maintained within the preferred temperature range during the cold winter months, but it additionally allows the temperature to be maintained very close to optimum during most of the year, since the greatest devviation from optimum will generally tend to be on the low side. Thus, in temperate regions, the maximum temperature in bodies of water is approximately 16° C., which is still close to the preferred range. However, the temperature will normally go down to about 1° C. to 2° C. in the wintertime, and even under extreme cold conditions, the fresh water blanket of the present invention will generally be capable of keeping the temperature from dropping below about 8° C., and usually will be able to maintain the temperature within the preferred range of about 10° C. to 14° C.

In order to obtain the maximum insulative effect of the fresh water blanket layer 112, it is preferred in the wintertime to keep a substantial thickness of the fresh water blanket 112, as for example approximately a 2-foot thick layer of fresh water. This thickness will be diminished as the insulating requirements are reduced in warmer weather, and preferably will be diminished to zero in the hottest part of the summertime. Thus, at the coldest season, the outlet level of the brackish water outlet conduit 58 will be approximately two feet below the level of spillway 120; while during the summertime, the outlet level of conduit 58 will be as high as, or higher than, the level of spillway 120.

The fresh water 112 provides its "greenhouse effect" on the brackish zones 18 and 20 regardless of its own temperature. Hence, the fresh water lens temperature may fluctuate anywhere between about 0° C. and about 20° C. without diminishing the desired greenhouse effect. For example, with the fresh water layer at its temperature of maximum density, about 4° C., it will nevertheless insulate the lower layers, allowing the sun to heat the brackish layers 18 and 20 to within the optimum temperature range of about 10° C. to 14° C.

It is to be emphasized that the fresh water blanket layer is substantially transparent to sunlight by virtue of its low nutrient content, whereas the brackish water will absorb, and thereby be heated, by sunlight by virtue of its phytoplankton population.

A body of water will normally lose heat by evaporation, by radiation, and by convection (e.g., wind over the surface); the large factors generally being evaporation and radiation. However, with the fresh water blanket covering the brackish water zones, evaporation and convection are only from the fresh water layer, so these factors are eliminated with respect to the brackish layers. Any conduction is minimal at the brackish water-fresh water interface, and there is also no substantial convection between the brackish water and the fresh water because of the discrete layering thereof, particularly as 4° C. is approached in the fresh water. Radiation from water in general is in the infrared zone, which water absorbs, and roughly 80% of the radiation upwardly from the brackish water will be captured in the fresh water blanket and re-radiated back down, and thereby not lost to the system.

The nutrient trap

Movement of the euphotic zone 18 in the downstream direction, and movement of the subeuphotic or bottom zone 20 oppositely or in the upstream direction, results in an effective nutrient trap for the primary body 10 of water. In this nutrient trap operation, phytoplankton will rapidly photosynthetically regenerate protoplasm from nutrients in the euphotic zone 18, and such conversion will occur with maximum effectiveness in the region of the upstream end of the body of water because of the upwelling of nutrients and photoplankton in the upstream mixing chimney 26, and also because of nutrients provided from one or more fry ponds at the upstream end. Phytoplankton and nutrients (including fecal pellets) will fall down from the euphotic zone 18 into the lower zone 20, and most of this will occur toward the upstream end of the body of water, and generally within the upstream half thereof. As soon as the phytoplankton and fecal pellets thus fall into the lower zone 20, they commence moving in the upstream direction, to be provided again to the euphotic zone proximate the upstream end of the body of water. This nutrient trap cycle not only continually resupplies the phytoplankton with nutrients in the euphotic zone, but it also brings phytoplankton back into the euphotic zone where it will function under the action of the available sunlight to convert the nutrients to protoplasm, and it avoids eutrophication of both phytoplankton and nutrients in the bottom of the body of water.

Phytoplankton will stay alive below their "compensation depth" (the depth at which they receive only sufficient light to maintain themselves) for at least about a week. It is therefore desirable to have the bottom layer 20 sweep upstream at a rate which will avoid the bulk of the phytoplankton remaining in the lower layer 20 longer than about a week. Since most of the phytoplankton are produced in the upstream half of the euphotic zone, they fall into the lower zone 20 mostly in the upstream half, so that most of the phytoplankton that have fallen will be returned to the euphotic zone within a week if the lower zone 20 moves at a rate to cause a complete sweep thereof within about two weeks. This would mean a complete circulation rate for the body of water of approximately 1 month. Accordingly, the preferred circulation rate for the body of water 10 has the bottom layer 20 completely changing within about one to two weeks. However, under actual conditions the phytoplankton hold nutrient levels at very low values as their rate of growth is controlled by the rate of nutrient availability, so that the circulation need not be this rapid to prevent the bottom layer from going anoxic, particularly with preferred bottom feeding species present. Thus, the usable range for the rate of flow of the bottom layer 20 is for it to undergo a complete sweep within from about 2 days to about 2 months.

Under natural sea water conditions with fairly adequate nutrients, phytoplankton "fix" approximately 3 grams of protoplasm carbon per square meter per day over a photosynthetic depth of about 10 meters (33 feet). Up to this rate, phytoplankton can regenerate protoplasm essentially as fast as the animals release nutrients in the form of animal unconverted matter such as fecal pellets and the like. For example, under adequate nutrient conditions, phytoplankton abundance can double or more in amount each day. In turn, the total amount of phytoplankton at any time is held very small by the filterfeeding animals. Typically 50 to 70 percent of the phytoplankton existing in the afternoon will have been consumed by the forage species by the next morning, when light will again cause full regeneration of the previous day's level. In the present rearing system, the phytoplankton standing biomass will be on the order of about 1 percent of the biomass of the filterfeeding species.

It will thus be seen that the present nutrient trap arrangement is highly effective in minimizing the levels at any time of materials which can cause eutrophication in the lower level, so that the rate of upstream sweeping movement of the lower layer 20 need not be rapid.

Depth and circulation

The minimum depth for each of the two brackish water layers 18 and 20 is approximately 2 feet, with another foot of depth required for each of these layers per mile of length of the body 10 of water. However, for a number of reasons it is desirable to have the body 10 of water at least ten feet deep, and preferably within the range of about 30 feet to 100 feet in depth. One reason why it is desirable to have considerable depth is because by having a large mass of water in the body 10 relative to the surface area, there will be a "thermal flywheel" effect that will avoid any rapid changes in temperature in the body of water, and hence avoid thermal shock to the animals and phytoplankton growing in the system.

Substantial depth in the body 10 of water is also desired for optimum phytoplankton production. This will be apparent from FIG. 7 of the drawings, wherein curves 126, 128, and 130 indicate the vertical distribution of phytoplankton photosynthesis under conditions respectively of minimum transparency, average transparency, and maximum transparency, in a homogeneously distributed population under bright sunlight in the open ocean. Curves 126, 128 and 130 indicate that phytoplankton production in the present invention will be optimum with a photosynthetic depth (i.e., a depth for the euphotic zone 18) of about 10 meters or 33 feet. The bottom zone 20 will normally have substantially the same depth as the euphotic zone 18, so that with the preferred depth of the euphotic zone 18 for maximum phytoplankton production according to FIG. 7, the total brackish water depth will be on the order of 20 meters or about 66 feet, which is intermediate the generally preferred depth range of from about 30 feet to about 100 feet.

The mixing system employed for circulating the water in the body 10 is self-regulating, and tends to automatically adjust the level of the interface 132 between layers 18 and 20 so that the layers 18 and 20 have substantially equal heights. Thus, if the interface tends to rise, there is less pressure head in the downflow chimney 24, causing less flow to the lower layer which tends to drop the interface 132 back down. Similarly, if the interface 132 rises, there is less upwardly directed pressure head in the mixer 26. An opposite effect will tend to raise the interface 132 if it drops below the equal level height for layers 18 and 20.

The mixing chimneys 24 and 26 will generally be made higher for deeper bodies of water, so as to take maximum advantage of the specific gravity difference between the zones 18 and 20 in establishing circulation in the system. Thus, when sea water of approximately 35 o/oo salinity mixes with the water of 11.4 o.oo salinity in upper layer 18, it will produce a mixture having 11.7 o/oo within the chimney 24, and the higher this mixture exists above the interface 132 in the chimney 24, the greater the pressure head thereof causing circulation in the system. Similarly, the deeper the upstream chimney 26 extends, the greater the mixing pressure head, and hence mixing action, in mixer 26. If the body 10 of water to be circulated is deep, then a large flow volume will be required relative to the net inflow to and outflow from the body 10 (inflow being sea water through conduit 28 and fresh water through conduit 32; outflow through conduit 58). In general, the height available allows the necessary pressure head to be present to keep pace with the desired residence time; i.e., the greater the height, the greater the pressure head available for mixing, but the more volume required to be displaced.

Considerable depth in the body 10 of water is desirable also in a system wherein the difference between the salinities of the lower and upper brackish layers is small, as for example the 0.3 o/oo difference between 11.7 o/oo for the layer 20 and 11.4 o/oo for the layer 18, which is desirable in rearing Atlantic salmon. Even with such small difference, with substantial depth in the body, there will be adequate pressure head for the desired mixing. As stated above, the minimum o/oo difference between the bottom and upper brackish layers for providing the desired pressure head for mixing, and to assure good, discrete layering, is about 0.1 o/oo.

While it is desirable to thus utilize the energy available from the sea water and fresh water inlets to cause the circulation in the body 10 of water, so as to minimize power requirements in the system, nevertheless it is to be understood that all or part of the circulation in the body 10 of water may be provided by pumping action.

The circulation system illustrated in FIGS. 1 to 5 and described hereinabove has the further advantage of tending to destroy harmful bacteria and undesired species of phytoplankton entering the system. Harmful bacteria and undesired phytoplankton undergo the shock of a rapid change in salinity in the mixer 24, e.g., the salinity for such entering organisms will change from 35 o/oo to about 11.7 o/oo in a fraction of a minute in the mixer 24. Similarly, harmful bacteria and undesired phytoplankton entering with the fresh water 32 will undergo the shock of the sudden change in salinity from approximately zero in the fresh water to approximately 11.4 o/oo in the mixer 26. Accordingly, entering disease bacteria tend to be minimized, and also the system is permitted to be selectively inoculated with the desired species of phytoplankton.

However, phytoplankton and the carnivorous and forage animals in the system which may pass through the mixing chimneys 24 and 26 will not undergo such a shock, but will simply undergo a change of 0.3 o/oo, which will not adversely affect them. It is preferred that the mixing chamber 100 in mixers 24 and 26 be sufficiently open for the animals being reared to freely pass through in the event they should be drawn into one of the mixers.

The phytoplankton

While there is a wide variety of phytoplankton that can be employed to advantage in the present lake or pond example, some particularly desirable species are the following:

1. Pterosperma dictyon

This is a green algae which is high in tryptophane. The advantage of having a green algae as part of the phytoplankton population is that green algae produce their own vitamins and supply them to their environment. Three vitamins of which some phytoplankton tend to require are B-12, thiamin, and biotin, and of these three, B-12 is of particular importance as it is needed by many species of phytoplankton.

2. Skeletonema costatum

This is a chain-forming diatom. It is thought that the presence of chain-forming diatoms is important as an aid to filter-feeding fish, in that the diatom chains bridge across gills or their rakers and aid in filtering out individual members of other phytoplankton species. This species has the further advantages of a low vitamin B-12 requirement, and of being very fast growing. Thus, it will double in only about three hours in a favorable environment. This species is also high in the essential amino acids, arginine and isoleucine, which tend to be limited in several of the common species of phytoplankton, thus providing a balance of these amino acids in the system.

The continued presence of a fast-growing phytoplankton species which requires vitamin B-12, but only at very low concentrations such as is the case with Skeletonema costatum, is of great importance since it limits B-12 concentrations, and thereby limits the growth of undesirable species, which require higher B-12 concentrations and which the filter-feeding species do not consume as high fractions of their diet. Such species are responsible for "red tides" in oceans. Skeletoma costatum is particularly desirable for this purpose because it forms large numbers of spores when it leaves the euphotic zone. Thus, when these return thereto it can extremely rapidly assume a dominant position in the phytoplankton, whereby its continued presence is stabilized with the subject system.

3. Isochrysis galbana

This is a small, naked flagellate, which is easily digestible by the filter-feeding species, and is high in the essential amino acids, histidine, lysine, and valine.

4. Nostoc muscorum

This is a blue-green algae which is a nitrogen fixer, thereby reducing the need for supplementing the water with nitrogen fertilizers. It is also highly edible by the filter-feeders.

The fry

The hatchery and fry ponds are preferably both located upstream of the primary enclosed body of water. It is desirable in the rearing of Atlantic salmon to get early eggs, which may be fertilized in the latter part of October, resulting in an early winter hatch time, so that the fry will commence feeding around the first of January. With the cycle started at this time, and the excellent growth of the salmon with the present system, a two-year Atlantic salmon crop with wet weights on the order of 8 pounds can be harvested in midwinter when the fishing crop is essentially nonexistent, and the only Atlantic salmon otherwide available is the less desirable canned or frozen salmon.

Since the fry hatch around the first of January, and in order to obtain maximum growth of the dry, it is important that the fry ponds be heated, and they are preferably heated to within a range of from about 10° C. to about 14° C. Preferably all of the water from the fry ponds is provided, with other fresh water as required, through the conduit 32 to the mixing chimney 26, and hence into the body 10 of water, thereby conserving the thermal energy and also the nutrients therein. There will be approximately a 20 percent to 25% conversion of feed ration to fish meat (on a dry basis) in the fry ponds, and the remainder of the feed ration not converted will all be available as nutrients in the primary body of water.

The fry are transferred to the primary body of water as smolts when the brackish water in the primary body is substantially up to the temperature of the temperature in the fry ponds, and the transfer is preferably a gradual one from the fresh water to the brackish water of the main body. It is desirable to net or screen off an upstream portion of the primary body near the dry ponds for less than one year old salmons, which are not yet fish eaters, to avoid cannibalism while nevertheless allowing them to be part of the nutrient cycle in the main body.

Ration feed

The ration feed requirements for the Atlantic salmon at their various stages of development in the present system are generally as follows:

| Stage | Age, Months | Ration Feed |
|---|---|---|
| Fry | 0–6 | 100% |
| Smolts | 6–12 | 80 |
| Yearlings | 12–15 | 50 |
| Yearlings | 15+ | 10 |

The fry will be fed pellet food, and the smolts also preferably will eat zooplankton and insect larvae and the like. The pellet food for the fry will generally start at about one-sixty-fourth inch diameter or less pellets, and the size can be made longer as the fry grow. A good natural food for fry is Claderocan species, e.g., Daphnia pulsex, commonly called "water fleas", which are smaller than copepods (the typical zooplankton). A separate rearing section may be provided ahead of the fry ponds for maturing and providing a continuous supply of such feed species to the fry.

The pellet food to be utilized in rearing Atlantic salmon is well known in the art, and has been developed mainly for trout. The important considerations are that the fat and amino acids be of the proper types, and that the pellet food be nonrancid. In this regard, generally if the moisture concentration is less than about 8½ percent by weight, refrigeration will not be necessary, but if the moisture concentration is greater than about 8½ percent by weight (which is true for some commercial pellets), then they must be kept in cold storage or supplied daily. Such pellet food generally consists of fishmeal, shrimp waste, soybean oil and cottonseed meal, with added vitamins and minerals, and they are readily commercially available. Such pellet food is preferred as the ration feed in the rearing of Atlantic salmon. Nevertheless, it is to be understood that alternatively, or supplementally, the salmon may be fed rations comprising ground fish, crustaceans, and/or bivalves.

The salmon become primarily fish eaters when they are in the 12 to 15 month stage, and then they will will mainly be eating the threadfin shad, along with some supplement from stonerollers, opossum shrimp, and the like. It is preferable to continue some ration feeding even when the salmon have become fish eaters, for two purposes; (1) for the provision of medicated food for controlling disease; and (2) for grading of the fish according to size or otherwise by individual feeding while the fish pass along a trough.

With the nutrient trap arrangement of the primary body 10, all of the essential nutrients can be supplied without loss thereof in the system, either as feed rations or as inorganic substances, and these can be provided in the approximate amounts and proportions which the carnivorous product requires, since in general the phytoplankton are somewhat "elastic" in their ability to absorb essential trace elements present.

Furthermore, by supplying some inorganics, not only can the nutrient levels be adjusted for maximum productivity but by including $CO_2$ as an added inorganic, which will be converted by the phytoplankton in part to oxygen, it is practical to ensure DO levels near optimum for growth rate.

Forebay operation

The forebay or secondary enclosed body of water 38 provides an even greater nutrient trap effect to the overall system. Thus, the forebay provides a substantial period of time and a substantial area over which any of the nutrients leaving the primary body of water with the brackish water outflow through conduit 58 can settle from the upper brackish layer 48 into the lower sea water layer 50 so as to be recovered and pumped back into the primary body 10 of water with the sea water 50. Additionally, new nutrient products that may be formed in the upper, brackish level 48 in the forebay will tend to fall into the lower, sea water level 50, to be recovered and pumped to the primary body of water. Finally, the nutrients coming into the forebay through conduit 52 and check valve 54 with incoming sea water tend to be trapped and retained in the system.

By providing the fresh water blanket or lens layer 114 in the cold weather season, the entire body of water in the forebay, including the lower sea water layer 50, becomes preheated to minimize thermal shock in the introduction thereof into the primary body 10 of water, and to help maintain the primary body 10 at the desired wintertime temperature. This forebay lens or blanket 114 of fresh water also will help make the brackish layer a more productive layer.

The forebay preferably has sufficient volume so that its level will remain near the high tide level for the adjacent ocean 40, thereby minimizing the expenditure of energy for pumping from the sea water layer 50 up to the primary body 10 of water. In other words, part of the function of the forebay is to utilize tidal power to pump the body of water therein to the high tide level.

Production of Various Carnivorous Species

In general, it is preferred that the dry of the carnivorous species be hatched and reared for a period in enclosures which discharge into the main rearing systems, whether the enclosures are fry ponds such as the pond 34 in FIG. 1, or net pens, or other enclosures. In the case of net pens, mesh sizes will generally be selected to be small enough so that predator species are prevented from entering. In the case of fry ponds, feed water, which may or may not be taken from the main system, will usually be filtered and may even be sterilized, using, for example, ultraviolet light or chlorine injection, both of which methods are well known in the art, so that not only will predactors be avoided, but also parasites and pathogenic organisms such as fungus, bacteria, and protozoa. As set forth in the Atlantic salmon example above, in non-tropic areas, the water supplied to the fry will also generally be heated as required.

In general, the food supply to the fry of the carnivorous species will be carefully managed for maximum growth rate, based upon the particular food requirements of the fry or larvae of the particular carnivorous species being used. In this manner, both growth rate and survival are maximized.

In the present specification, and in the appended claims the term "fry" is intended in general to also include larvae of some carnivores to be reared, as for example shrimp or lobster or the like.

In the fry rearing areas the water will be replaced rapidly so that DO is kept high and excess nonliving food as well as the concentration of excreted products will be kept to very low levels. The residence time of the water will depend upon stocking density (i.e., pounds of fry per cubic foot of water), upon metabolic rate of the species as function of size and temperature, upon Ph of the water, and other factors such as phytoplankton growth in the area. The influence of these factors for most of the carnivorous species in economic demand is well known in the art. In general, however, water renewal will usually be much more rapid in the fry rearing areas than in the main rearing system where the post-frey juveniles are reared.

In general, the newly hatched fry of typical carnivorous aquatic species of interest are exceedingly small as compared to the desired product size, overall growth in the total rearing system being on the order of 1,000 to 10,000 fold. Therefore, fry areas will be only a very minor fraction of the total system area.

As indicated in connection with FIG. 1, water from the fry rearing areas will normally be discharged into the main rearing area where the water is rejuvenated by phytoplankton, under the action of sunlight, reconverting the fry wastes to protoplasm that is rapidly assimilated by the filter-feeding species.

The growth of the carnivorous species will generally be seasonal and to a large degree simultaneous or synchronous. This is not only because of seasonal climatic and marketing factors, but also because by restricting the populations of the carnivorous species within a given enclosure to similar ages, and therefore sizes, cannibalism is minimized.

Since growth of the carnivorous species being reared is in large exponential, most of the absolute growth occurs within the last 10 to 20 percent of the rearing time. This is seen for the growth for Atlantic salmon in curve 122 in FIG. 8. This rapid absolute growth is to be distinguished from percentage growth, which is greatest when the carnivorous species is small, and is slowing down during the last part of the rearing time. This extremely rapid absolute growth in the final rearing period would ordinarily impose heavy demands not only upon the logistics of feed supply, but more important on the rearing system, and it is during this period that the system is pressing against its ultimate capacity. The present invention solves this problem in two ways: (1) first, by utilizing a live grading system to grade out specimens of the carnivorous species which have already reached desired marketing size, thereby allowing further growth of remaining specimens without exceeding system capacity; and (2) the very presence of the forage species. The forage species serves as a "biomass flywheel", in that during periods when much of the total feed to the system is being devoted to fry rearing, the filter-feeding species grows faster than its need by the system, and conversely during final growth to marketable size of the carnivorous species, large quantities of the filter-feeding species have now become available for feed to the carnivorous species. During this entire cycle the system of the invention has protected the desired carnivorous species from excessive accumulations of waste products, and depletion of DO.

Because of the almost complete retention of nutrients in the nutrient trap of the systems, for each pound of total feed applied in the system, the fraction which is unconverted to flesh of the carnivorous species is rapidly converted to growth of the filter-feeding species, which ultimately becomes food for the further growth of the carnivorous species, through the intermediate step of refixation as protoplasm by the phytoplankton.

On the basis of known conversion efficiencies from phytoplankton to animal, from feed to animal, and from animal to animal, and based upon known growth curves for the desired carnivorous species, the maximum allowable amount of feed for any time in the rearing schedule can be easily calculated. By keeping the total feed added to the system below such maximum calculated amount, the system will not go into a dissolved oxygen deficit; i.e., phytoplankton will be able to restore oxygen levels from nutrients available. There will also be additional DO from water/oxygen interchange with the atmosphere and oxygen supplied in the incoming water, which will provide approximately an added 8 percent margin. In practice, the DO level in a system according to the invention will be continuously monitored and ration feed decreased if DO shows any appreciable decrease below saturation.

The ultimate production capacity of the system is limited only by the ability of the phytoplankton therein to restore oxygen and remove metabolic wastes, and as pointed out hereinabove, the protein production capacity of phytoplankton is many times that of various agricultural products, as for example more than 50 times that for wheat. The high protein productive capacity of the system can then be readily visualized from the fact that plant-to-animal conversion efficiency will be generally about 22 percent, while animal-to-animal conversion efficiency will generally be about 33 percent. This would result in a protein productivity per acre per year more than 2½ times that for the agricultural product wheat. As compared to agricultural meat production, the present system would produce on the order of over 13 times the number of pounds of protein per acre per year.

The Rearing of Tropical or Subtropical Carnivorous Non-Air Breathing Animals

An atoll embodiment

Figure 9:
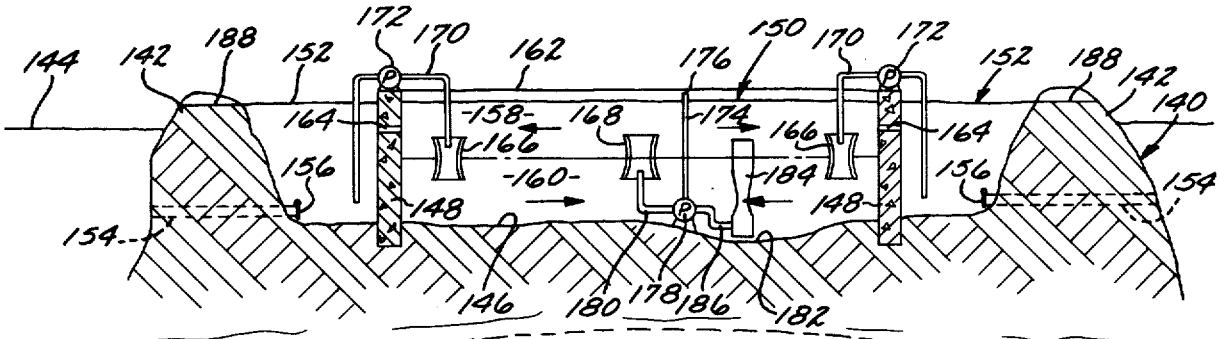
FIG. 9 is a vertical section, with portions in elevation, diagrammatically illustrating another form of the invention applied to an atoll, and embodying a primary rearing body of water and a pair of forebays.
Figure 10:
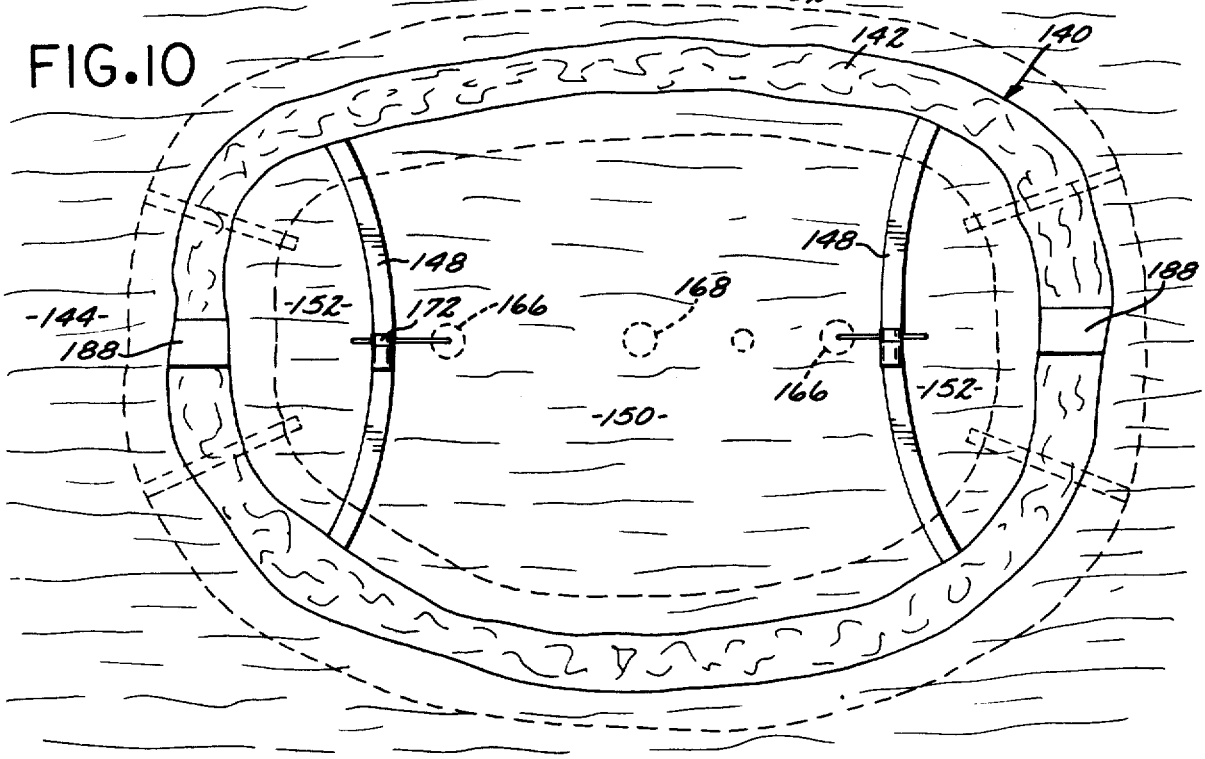
FIG. 10 is a diagrammatic plan view of the embodiment shown in FIG. 9.

FIGS. 9 and 10 illustrate an adaptation of the present invention to the rearing of carnivorous species in tropical or subtropical areas, where atolls provide convenient existing generally enclosed bodies of water than can be utilized with a minimum of structural modification. It is to be understood that FIGS. 9 and 10 are diagrammatic and not intended to disclose relative dimensions as they would actually exist in practice.

The atoll formation is generally designated 140, and is a coral structure having a generally continuous peripheral rim 142 which projects above the level of the surrounding ocean 144, and together with a bottom 146 contains a generally enclosed body of water separated from the ocean 144.

A pair of arcuate dams 148 divides the atoll into three discrete bodies of water, a large central primary body 150, and a pair of smaller secondary bodies or forebays 152 at opposite ends or sides of the atoll. With the arcuate-shaped dams 148, these forebays 152 are generally lens-shaped is plan view.

Sea water is introduced into the system through passages 154 extending through the atoll rim to provide communication between the ocean 144 and forebays 152 near the bottoms thereof. Check valves 156 in passages 154 cause the sea water to be introduced into the forebays by tidal pumping action. The main body 150 of water includes upper and lower brackish layers or zones 158 and 160, respectively, the salinity of the upper brackish layer 158 being somewhat less than that of the lower brackish layer 160 to maintain these discrete zones and for circulation purposes.

Rainfall is the source of fresh water for the system illustrated in FIGS. 9 and 10. It is contemplated that this atoll embodiment will be in an area wherein the amount of rainfall exceeds the rate of evaporation, and wherein the rainfall preferably occurs throughout the year. The rainwater is gathered on the primary body 150, preferably as a discrete layer 162 on top of the upper brackish layer 158. The thickness of the layer 162 may be controlled, either by adjustable spillway means (not shown) over either or both of the dams 148, or by control of either the height or the orifices of the brackish water outlets, which are shown as passages 164 through the dams 148 at an intermediate height within the upper brackish layer 158.

Circulation and discrete layering of the brackish layers 158 and 160 is accomplished by downflow mixing chimneys 166 in the primary body 150 of water proximate the dams 148, and upflow mixing chimney 168 proxmiate the center of the primary body 150. Sea water is provided from low regions in the forebays 152 through conduits 170 to the mixing chimneys 166 so as to flow downwardly to the chimneys 166, thereby causing a circulation of the upper brackish layer 158 generally from the center of body 150 toward the ends thereof proximate the dams 148, and increasing the salinity thereof so that the salinity of the lower brackish layer 160 is greater than that of the upper brackish layer 158. This also causes a circulation of the lower brackish layer in the direction from the dams 148 generally toward the center of the primary body 150. Generally, tidal action will provide adequate pumping to move the sea water from the forebays 152 through conduits 170 into the downflow chimneys 166. However, pump means 172 may be provided in each of the sea water conduits 170 for supplemental pumping as required; such pumping may be needed during times of excessively low tides when the volume of water tends to become diminished in the forebays 152.

Upflow mixing chimney 168 in the center of body 150 is provided with fresh water (or if the fresh water layer 162 becomes very thin or unduly disturbed, with very low salinity brackish water), through fresh water pickup conduit 174 which extends upwardly to an inlet end 176 in the level of fresh water layer 162. A pump 178 pumps the fresh water in through pickup conduit 174, and supplies the fresh water through fresh water supply conduit 180 to the upflow chimney 168. This upflowing fresh water mixes in chimney 168 with the brackish water from lower layer 160, reducing the salinity thereof to that of the upper brackish layer 158, and causing the lower brackish layer 160 to flow generally toward the center of the primary body 150, and the upper brackish layer 158 to flow generally outwardly from the center of the body 150.

It is contemplated that sea water may infiltrate to a lowest region 182 in the primary body. The avoid interference with the system, it is desirable to provide a small auxiliary upflow mixing chimney 184 in communication with this lowest region 182, and to supply upflowing fresh water therein through an auxiliary fresh water supply conduit 186 provided with fresh water by pump 178. The resulting brackish water is dispensed from the chimney 184 into the upper brackish layer 158.

It will be understood that the mixing chimneys 166, 168, and 184 may be of the type disclosed in FIGS. 4 and 5.

As sea water is pumped from forebays 152 into the main body 150 of water, fresh water is displaced over the tops of dams 148 into the tops of forebays 152, while brackish water flows out into the upper levels of forebays 152 through outlets 164. The forebays 152 are then vented back to the ocean 144 over spillways 188 in the rim 142 of the atoll, or through other suitable outlets, and this vented water will be relatively low salinity water from the fresh water overflow and the brackish water outflow. Thus, the outflow will not materially interfere with the salinity of the incoming sea water.

While two of the forebays 152 have been shown in FIGS. 9 and 10, it will be understood that a single forebay may be employed, with the upflow chimney and fresh water pickup generally at the opposite side or end of the atoll from the forebay.

The carnivorous animals to be reared in the atoll system will generally be adapted to considerably higher temperatures than discussed above in connection with the system of FIG. 1 and the rearing of Atlantic salmon. Thus, a typical temperature range from the atoll system will be from about 20° C. to about 35° C. for the primary body 150 of water. The carnivorous animals adapted to such higher temperatures are also adapted to higher salinities and relatively lower dissolved oxygen amounts. A wide range of salinities may be selected from this system, preferably according to what is close to optimum for the particular carnivorous animals being reared. For example, the salinities for the layers 158 and 160 may be as low as about 13 o/oo and 15 o/oo, respectively; or they may go as high as 30 or more o/oo. Sea water may have a higher salinity in tropical regions than in temperate climates, as for example up to about 37 o/oo. If relatively low salinities are desired for the layers 158 and 160, then it is desirable to entrap and retain a higher amount of rainfall in the body 150. In general, a geographical area is to be chosen for the systems of FIGS. 9 and 10 which has an excess of rainfall rate above the evaporation rate as required, and if this excess is substantial, relatively low salinities can be provided. In general, areas having greater than 50 inches of rainfall per year will comply with this criterion.

Spiny lobsters and shrimps

Several particularly desirable carnivorous aquatic non-air breathing animals suitable for rearing in a warm climate according to the present invention are spiny lobsters, and some types of shrimps or prawns ("prawn" being a synonym for "shrimp" used in some English speaking areas). Spiny lobsters to be reared in the system are of the superfamily Scyllaridea, which is composed of the two families Palinurid and Scyllarid lobsters. These families prefer an environment of crevices in walls and rocky bottoms.

Suitable shrimps to be reared in the system include the sub-order Natantia; preferably Penaeid shrimps; and most preferably such shrimps as Panaeus japonicus which prefer a sand bottom, Panaeus monodon which prefer a mud or clay or slit bottom, and panaeus duorarum which also prefer a sand bottom.

Suitable filter-feeding species, which feed by filtration primarily on phytoplankton, upon which these carnivorous animals may feed are several species of bivalves, including mussels, clams, cockles, and oysters.

Of these various species of bivalves, mussels are preferred, since they are fast growing, and at the most preferred temperatures they spawn all year around. Furthermore, the mussels will attach themselves to ropes off of the bottom where they are generally free of predation, and where they are able to filter the water more efficiently to feed on the phytoplankton because of the more substantial movement of the water off of the bottom.

In tropical or subtropical environments, it is preferred to use correspondingly adapted mussel species, such as the "green mussel" Mytilus smaragdinus. In temperate zone areas, a mussel species adapted for such regions would be chosen, as for example Mytilus edulis.

Such bivalve filter-feeding species generally have an initial mobile larval stage wherein large quantities of larvae provide mobile forage for the carnivorous species, particularly the larval stages thereof; and then they mature as generally stationary animals. Those filter-feeding bivalves which are not eaten as mobile larvae by the carnivorous species are allowed to mature sufficiently long to produce a large mass of progeny which is substantial relative to the mass of the parents. This not only produces a substantial mass of mobile larval forage for the carnivorous species to assist in stabilizing the DO in a manner similar to the mobile forage for the salmon referred to hereinabove, but this also assures the production of further crops of mature bivalves. In the case of the preferred mussels, it is desirable that those mussels which affix themselves be allowed to mature for at least a year, and preferably for longer than 14 months, to assure the desired mass of progeny.

Figure 16:
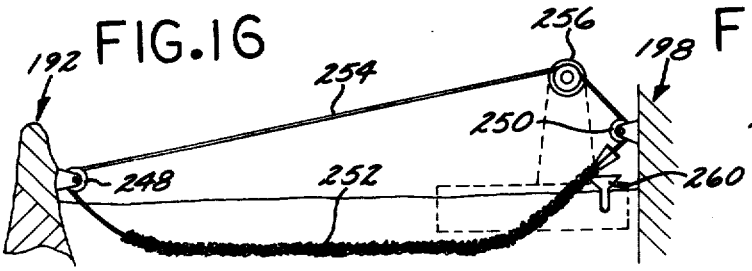
FIG. 16 is a diagrammatic elevational view illustrating rope apparatus which may be used in the form of the invention shown in FIGS. 11-13 upon which the mussel filterfeeding species may be grown.
Figure 17:
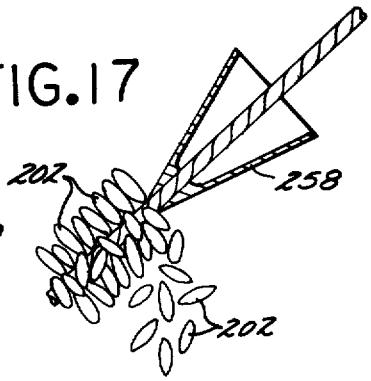
FIG. 17 is an enlarged fragmentary, sectional view, partly in elevation, illustrating separating means of FIG. 16 which may be employed for harvesting mature animals.

Then, after the mature mussels or other bivalves have had an opportunity for substantial reproduction, they are harvested and ground up to provide a substantial part of the feed for the various stages of the carnivorous species being reared. The preferred mussels, by attaching themselves to ropes, are particularly easy to harvest after maturity by passing the ropes through suitable scraping or separating means as illustrated in FIGS. 16 and 17.

One of the important advantages of the use of bivalves as the filter-feeding species for rearing both shrimps and lobsters is that calcium carbonate is essential in the diets of these carnivorous animals. The ground up shells of the bivalves are therefore desirably mixed up with the meat for feeding shrimps and lobsters. Both species east by "picking at" their food, so that any excess bivalve shell material available does not have to be eaten by the shrimps or lobsters, and will generally simply lie on the bottom without in any way harming the system.

Another possible filter-feeding species for use in the system is Tridacna gigas, which is the very large clam that is natural to atolls. These are so large that they would generally be individually hauled aboard a boat or scow and then ground up.

Filter-feeding fish may also be used as the filterfeeding species in the rearing of lobsters, shrimps, and the like. An example of a suitable filter-feeding fish is the pearl spot, Etroplus suratencis, which is known to feed primarily on phytoplankton and on decayed plant vegetation. This type of filterfeeding fish will, like the bivalves, spawn naturally in a confined system.

Another atoll embodiment

FIGS. 11 to 17 illustrate an adaptation of an atoll 190 to the rearing of shrimp, spiny lobsters, or the like in accordance with the present invention. The peripheral rim 192 of the atoll encloses two principal regions, a main production region 194 for the carnivorous species, and a sink region 196 within which mussels are reared as the filter-feeding species. The main production region 194 and sink region 196 are preferably separated by a foraminous arcuate barrier 198 suitable for allowing the tidal flow of sea water from sink region 196 into main rearing area 194 and of brackish water from rearing area 194 back into sink region 196, while at the same time retaining the carnivorous species in the rearing area 194. The barrier 198 may include a notched weir, screen, or portions of each, or other suitable perforated structure. The foraminous barrier 198 also may include an inorganic nutrient rockpile section 200, including for example rock phosphate.

The main rearing area 194 will, in general, be much larger in area than the sink region 196, as for example about 10 times as large. A series of generally parallel mussel lines 202 are strung across the sink region 196 between the arcuate barrier and the rim 192. The number of such mussel lines 202 will, of course, depend upon the requirements of the system for both ground mussels and mussel larvae. The lines 202 in general will be disposed between about 1 and 6 feet apart horizontally, and between about 6 inches and 3 feet apart vertically, and anywhere from about two to twenty vertical layers may be arranged according to the depth of the sink region 196 and the requirements of the system.

The sink region includes the deepest part of the atoll, and sea water is introduced into the sink region 196 through an inlet conduit 204 which has a discharge end 206 near the bottom 208 of the sink region 196. A perforated layer 210 covers the discharge end 206 of the sea water inlet conduit so as to keep out predators and keep mussel larvae in, and this may be in the form of a sand layer, a nylon screen (e.g., 20 mesh per inch) or the like. This perforated barrier layer 210 will be screened from light by the mussel lines, so there will be little tendency for algae fouling; and fouling will tend to be avoided by tidal movement cleaning. Additionally, mussels will not settle in such low light, so there will not be fouling by growing mussels.

Preferably the inflow water is taken from a relatively substantial depth within the surroudning ocean, since, as is well known, nutrients are in much higher abundance in such water. It is preferred that the intake for the inflow water be at a depth in the ocean of greater than about 200 feet.

Figure 11:
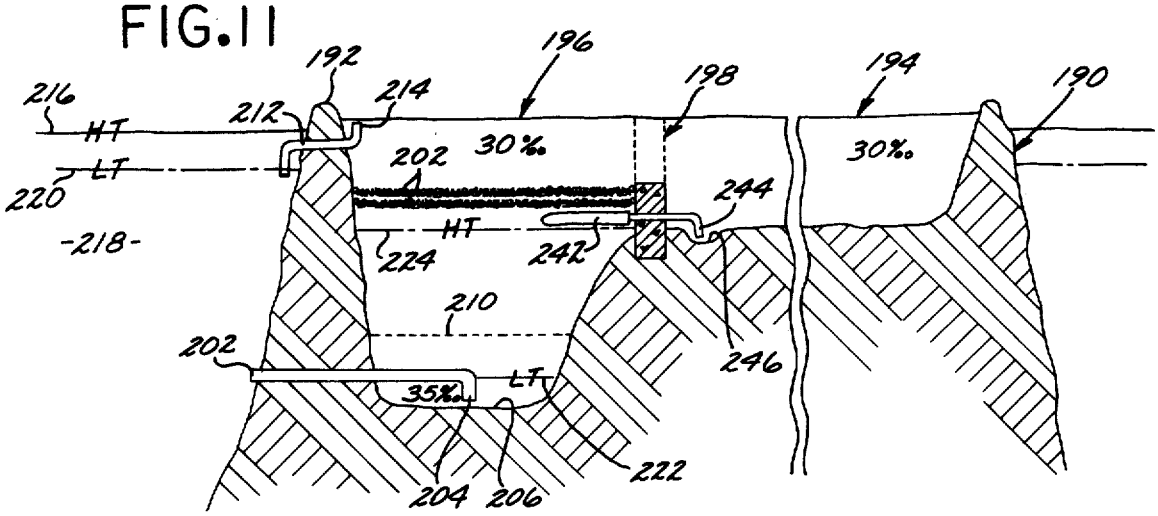
FIG. 11 is a vertical section with a portion broken away, illustrating another form of the invention applied to an atoll, and particularly adapted for rearing shrimp, spiny lobster, or the like as the carnivorous species, and for utilizing mussel and mussel larvae or other bivalves as the filter-feeding species.
Figure 12:
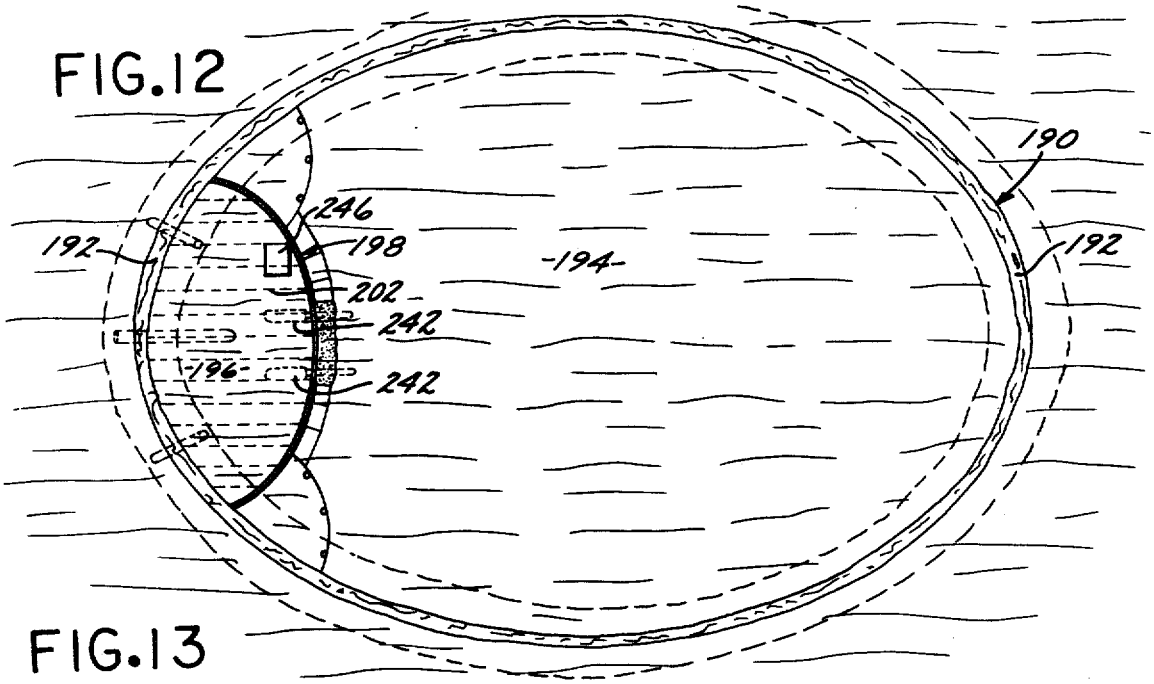
FIG. 12 is a diagrammatic plan view of the structure shown in FIG. 11.

One or more outlets for the system are located at stagnation points in the system so as to allow settling of nutrient products, phytoplankton or the like before the outflow, and in this way the system will operate as a nutrient trap, gaining nutrients from the sea water inlet, and retaining the nutrients for use in the system. Such a stagnation point for the system shown in FIGS. 11 and 12 is proximate the rim 192 in the sink region 196. The outlet means is illustrated in FIGS. 11 and 12 as conduits 212 having their pickup openings 214 located proximate and preferably slightly above the high tide level 216 for the ocean 218.

With the system of FIGS. 11 and 12, it is preferred to have generally even rainfall through the year, and surface rainwater is mixed with the sea water to create an upper brackish layer. Ingoing and outgoing tidal movements through the foraminous barrier 198 will tend to mix any surface rain in with the brackish layer, and also will keep the DO up by mixing in air.

Circulation in the system may be generally described as an upwelling movement of the incoming sea water from below the euphotic zone to within the euphotic zone (the euphotic zone being the upper brackish zone); with the addition of fresh water (rain) to the surface creating the brackish zone; and with upflowing movement including movement over a settling zone to a stagnation point and thence outflow back to the ocean. With the sea water inlet 204 in the deep sink region 196 of small area compared to the main rearing area 194, a small height difference between the ocean low tide level 220 and high tide level 216 will cause a much larger height difference between the low tide level 222 and the high tide level 224 in the sink region 196. There will accordingly be a substantial amount of tidal movement of the water through the mussel lines 202 to aid filtration by the mussels.

There will be a net inflow of the incoming sea water up through the mussel lines 202 and then into the main rearing region 194, within which most of the phytoplankton growth will occur in the system. This incoming sea water into the main rearing region 194 will, because of the large area of this region, generally become well mixed with the rainwater and the result is that most of the water in the main rearing region 194 will be brackish water.

Outflow of such brackish water will be from upper layers thereof, and will flow over the sink region 196 and the mussel lines therein, the sink region 196, and particularly that portion thereof toward the rim 192, will operate then as a settling zone wherein nutrients and phytoplankton coming from the main rearing area 194 will tend to drop down and be circulated by tidal movements through the mussel lines for filtration feeding of the mussels.

While the outlet means is illustrated in FIGS. 11 and 12 simply as outlet conduits 212, other outlet means may be employed with satisfactory results. For example, alternatively the outlet means can merely be porous strata such as sand or the porosity which is available from deposits of coral, through which the surface layer at the stagnation point will flow to the ocean.

It is to be noted that even though the outlet pickup openings, such the openings 214 of conduits 212, may be located above the high tide level 216 of the ocean, they nevertheless will obtain overflow from the body of water in the atoll, because the lower density of the upper brackish region will result in the surface of the body of water in the atoll being somewhat higher than the high tide surface level 216 for the ocean.

Figure 14:
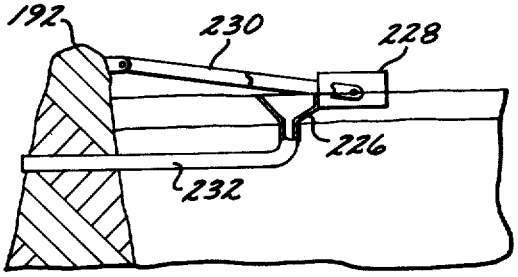
FIG. 14 is a fragmentary vertical section, with portions in elevation, illustrating outlet decanter mechanism which may be employed in one or more outlets in the form of the invention illustrated in FIGS. 11 to 13.
Figure 15:
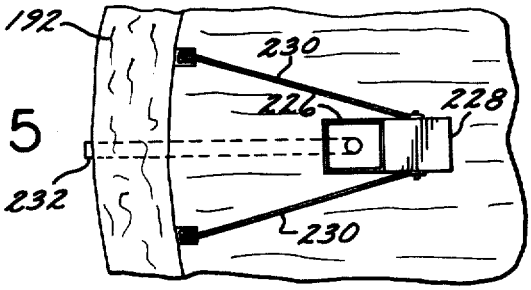
FIG. 15 is a fragmentary plan view further illustrating the mechanism of FIG. 14.

FIGS. 14 and 15 illustrate another type of outlet means which is adapted to automatically adjust the salinity of the upper brackish layer. This includes a decanter 226 attached to a flotation element 228 that is positioned for free vertical movement at the outer ends of a pair of arms 230 hingedly connected to the rim 192. The decanter 226 feeds flexible outflow conduit 232 which extends through the rim 192. The flotation element is such that the decanter is arranged to be level with the water at a particular desired brackish water salinity. If the salinity drops below this level proximate the surface from too much rainwater, then the flotation element sinks down in the water and the fresh or low salinity surface water will be run out at faster than normal outflow rate. On the other hand, if the salinity becomes higher than the desired level, the flotation element 228 will be floated higher thereby reducing the outflow of surface water and allowing rainwater to accumulate so as to then decrease the salinity. This arrangements, of course, requires that the rainfall exceed the evaporation.

The type of inflow and outflow means employed will also be governed by how rapidly it is desired to turn over the body of water enclosed in the atoll. Thus, if it is desired to turn over the water at the maximum possible rate, then the sea water inlet conduit means 204 will be provided with "in" check valve means, and the brackish water outlet conduit means 212 will be provided with "out" check valve means. Such arrangement is desirable where the general depth of the atoll enclosure is quite deep. With both inlet and outlet check valve means, if there is an ocean tide of two feet, then with a tide change twice a day, there would be a net two-foot upwelling (the inlet check valve means being proximate the lowest point in the system, and the outlet check valve means being proximate the highest point in the system), such upwelling occurring two times a day. This high rate of upwelling is to be preferred in the deeper lagoons in order to prevent the bottom layers from becoming anoxic.

However, if a lesser turnover is desired, as for example for shallower bodies of water then the check valve means may be omitted, as illustrated in FIGS. 11 and 12, or check valve means may be placed only in either the inlet conduit means or the outlet conduit means.

Figure 13:
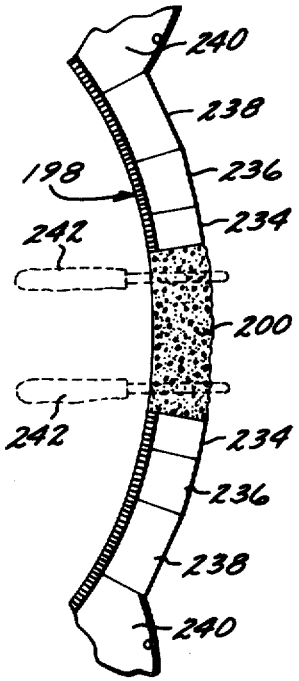
FIG. 13 is an enlarged fragmentary plan view of a portion of the structure shown in FIG. 12.

It is convenient to arrange tanks or net or screen enclosures for hatch, larval, and nursery areas for the carnivorous species in association with the foraminous barrier 198 because of the good flow and nutrient content of the water passing therethrough. FIG. 13 illustrates a convenient arrangement for the hatching and early development in the production of shrimp as the carnivorous species. In this arrangement the tanks or enclosed areas are arranged successively according to development stage so that successive crops of the species can be conveniently moved from one enclosure to an adjacent enclosure as it progresses from stage to stage. Thus, on each side of the central phosphate rockpile section 200 is a hatch tank 234, wherein the hatching shrimp have a residence time on the order of about one day. Next in line on each side is a larval tank or screened area 236, wherein the larvae have a residence time on the order of about 10 days. Next in line on each side is a postlarval enclosure 238, preferably a screened area, with a residence time on the order of about twenty days, and wherein the shrimp are reared to a weight on the order of about 10 mg. Mesh sizes for the larval and postlarval screened areas will be on the order of from about 120 to about 200 mesh per inch.

The shrimp are then moved from the postlarval enclosures 238 into nursery areas 240 adjacent end portions of the foraminous barrier 198, wherein the shrimp are further reared for about 30 to 40 days, to a weight on the orfer of about 1 gram, at which time they are ready for the main production region 194. The nursery areas 240 may be enclosed in nets or screens on the order of 20 mesh per inch.

After the shrimp are placed in the main production area 194, they will reach a harvestable size on the order of 20 to 40 grams in about four months. It is to be understood, however, that the harvesting weight and the length of time in the main production pond may be varied to suit economic requirements.

It is desirable to provide fertilizer in the main rearing area 194, which may be $NH_3$ or $NH_4NO_3$ and mineral traces. The bottom of the main rearing area 104 will be sand or mud, according to the preference of the species. A preferred temperate range for the rearing of shrimp is from about 23° C. to about 28° C., although the temperature may range from about 20° C. to about 35° C. It is desirable to establish a salinity for the brackish layer and in the main rearing area 194 on the order of about 30 o/oo, and the preferred salinity range for the rearing of shrimp is from about 28 o/oo to about 33 o/oo. The salinity of sea water in some tropical areas is substantially higher than that in temperature zones, and may range all the way up to about 38 o/oo. Although the preferred salinity range for rearing shrimp is between about 28 o/oo and 33 o/oo, it is to be understood that satisfactory results may be produced with a salinity ranging all the way from about 25 o/oo to about 37 o/oo.

The mature shrimp may be harvested in any desired manner. However, one convenient harvesting means is to provide net bags 242 in the sink region 196 which communicate through conduits 244 with a low point 246 in the main rearing area 194, for catching the mature shrimp which are attempting to come out of the system to spawn.

FIGS. 16 and 17 illustrate convenient apparatus for harvesting the mature mussels which have grown on the mussel lines 202. The harvesting equipment is conveniently located on a scow or barge 246 that is movable to desired positions in the sink region 196. Each of the ropes 202 bearing the mature mussels thereon may be suspended from pulleys 248 and 250 located respectively proximate the rim 192 and arcuate barrier 198, each rope bing a continuous being having a mussel-bearing portion 252 located within the water of the sink region 196, and having a generally clean portion 254 held up out of the water. The clean portion 254 of the rope loop may be held above the water by any convenient means, as for example by a pole or the like (not shown), until it is desired to harvest the mussels. Then, the barge or scow 246 is moved into position adjacent one of the pulleys, as for example the pulley 250, and winch means 256 on the barge is engaged with the clean portion 254 of the rope, and scraper means such as the conical scraper 258 is engaged over the rope as best shown in FIG. 17 (the scraper 258 may be slit longitudinally for such engagement). Then, the winch 256 is actuated to draw the mussel-bearing portion 252 of rope through the scraper 258 so as to scrape the mature mussels off of the rope and drop them into a grinder 260 on the scow or barge 246. As this scraping operation proceeds, clean rope will replace the mussel-bearing portion thereof, and the scraped mussel-bearing portion will replace much of the clean rope. Thus, the rope loop will at the end of the scraping operation be ready to grow another mussel crop thereon.

It is preferred to allow the mussels to mature before harvesting sufficiently so that they will produce large quantities of mussel larvae, both for the growing of further mature mussels after harvesting, and also to provide mussel larvae as a forage species for consumption by the shrimp or other carnivorous species. To this end, it is desirable to have at least a portion of the foraminous arcuate barrier 198 of sufficient porosity to allow a portion of the mussel larvae to pass therethrough the main rearing area 194 for consumption by the carnivorous species.

It will be apparent that the principal advantages pointed hereinabove in detail for the systems of FIG. 1 and of FIGS. 9 and 10 will also be present in the system of FIGS. 11 and 17.

I claim:

1. A method of aquaculture of a carnivorous aquatic non-air breathing species in a generally enclosed body of water, which comprises establishing an aqueous euphotic zone containing phytoplankton in said body of water above an aqueous bottom zone, providing nutrients in said euphotic zone sufficient to cause growth of phytoplankton [at a rate of at least about 2 grams of carbon per square meter per day], disposing a filter-feeding aquatic non-air breathing species in said body of water which will feed upon said phytoplankton and upon which said carnivorous species will feed, introducing said carnivorous species into said body of water, the excreta from said carnivorous and filter-feeding species providing at least a portion of said nutrients to said phytoplankton, said phytoplankton at least in part providing the food for said filter-feeding species, and protoplasm of said filter-feeding species at least in part providing the food for said carnivorous species, establishing a waterdriven upwelling movement of water in said body of water from within said bottom zone by introducing water into said bottom zone such that water in said bottom zone is moved upwardly to within said euphotic zone to recirculate nutrients from the bottom zone to the euphotic zone for reconversion therein by the phytoplankton, thereby generating oxygen and eliminating the toxicity of excreta to said carnivorous species, removing water from said euphotic zone near the surface thereof, and harvesting members of said carnivorous species which have grown to a desirable size.

2. The method of claim 1, wherein the young of carnivorous fish species are introduced into said body of water.

3. The method of claim 2 wherein the young of Atlantic salmon are introduced into said body of water.

4. The method of claim 1, which includes some ration feeding of said carnivorous species in addition to the feeding thereof on protoplasm of the filterfeeding species.

5. The method of claim 1, wherein said upwelling movement of water is at least in part caused by tidal action.

6. The method of claim 1, which comprises adding makeup water to said body of water, and removing water from an outlet zone of said body of water that is generally isolated from said upwelling movement of water.

7. The method of claim 6, wherein said upwelling movement is caused by having said makeup water of a different salinity than the water in said euphotic zone, and creating a pressure head in the addition of said makeup water that causes said upwelling movement.

8. The method of claim 1, wherein makeup water is added to said body of water including a sea water component and a fresh water component, said components being mixed to provide said brackish water.

9. The method of claim 8, wherein said brackish water has at least about 3 o/oo saline content.

10. The method of claim 9, wherein said brackish water has a saline content that is approximately isotonic for said carnivorous species.

11. The method of claim 8, which includes establishing a discrete fresh water insulating layer on top of said brackish water so as to raise the temperature in said body of water.

12. The method of claim 11, wherein said insulating layer is adjusted on a seasonal basis.

13. The method of claim 8, wherein brackish water is removed from said body of water.

14. The method of claim 13, wherein a forebay is associated with said body of water, said sea water component being moved as a lower zone in one direction through said forebay and then introduced into said body of water, and said brackish water that is removed from said body of water being moved as an upper zone in a direction generally opposite to said one direction through said forebay and then into the ocean.

15. The method of claim 14, which includes establishing a discrete fresh water insulating layer on top of said upper zone of said forebay so as to raise the temperature in said forebay.

16. The method of claim 8, wherein said sea water component is introduced into a lower zone in said body of water and said fresh water component is introduced into an upper zone in said body of water so as to create discrete upper and lower zones in said body of water with said lower zone having a higher salinity than said upper zone.

17. The method of claim 16, wherein said upper zone is included in said euphotic zone.

18. The method of claim 16, wherein the salinity difference between said lower and upper zones is at least about 0.1 o/oo saline content.

19. The method of claim 16, wherein said lower and upper zones are caused to move in generally opposite directions in said body of water.

20. The method of claim 19, wherein a brackish water outlet region is established, and wherein said upwelling movement is principally of water from said lower zone into said upper zone in a region of said body of water remote from said outlet region, and wherein brackish water is removed at said outlet region from said upper zone.

21. A system for the aquaculture of a carnivorous aquatic non-air breathing species, which comprises an enclosure having a body of water therein, an aqueous euphotic zone containing phytoplankton in said body of water above an aqueous bottom zone, a carnivorous species in said body of water, a filter-feeding species in said body of water which will feed upon said phytoplankton and upon which said carnivorous species will feed, the excreta from said carnivorous and filter-feeding species providing nutrients to said phytoplankton, said phytoplankton providing food for said filter-feeding species, said filterfeeding species providing food for said carnivorous species, water circulating means in said enclosure including water-driven means for introducing water into said bottom zone such that water in said bottom zone is moved upwardly causing an upwelling movement of water in said body of water from below said euphotic zone to within said euphotic zone to recirculate nutrients from said bottom zone to said euphotic zone for reconversion therein by the phytoplankton, thereby generating oxygen and eliminating the toxicity of excreta to said carnivorous species, and means for removing water from said euphotic zone near the surface thereof.

22. A system as defined in claim 21 wherein said water circulating means comprises, at least in part, sea water inlet means for introducing sea water into said enclosure.

23. A system as defined in claim 22, wherein said sea water inlet means comprises tidal inlet means whereby tidal movement at least in part causes upwelling.

24. A system as defined in claim 21, wherein said body of water includes lower and upper brackish water zones of respectively higher and lower salinities.

25. A system as defined in claim 24, in which said water circulating means causes movement of said upper and lower brackish water zones generally in opposite directions in said enclosure.

26. A system as defined in claim 25, wherein said circulating means comprises at least in part, sea water inlet means for introducing sea water into said lower brackish water zone.

27. A system as defined in claim 26, wherein said circulating means comprises, at least in part, fresh water inlet means for introducing fresh water into said upper brackish zone.

28. A system as defined in claim 21, wherein said body of water in said enclosure is principally brackish water having an upper boundary, and fresh water inlet means in said enclosure proximate said boundary for flowing a discrete fresh water insulating layer on top of said brackish water boundary so as to raise the temperature in said brackish water.

29. A system as defined in claim 28, which includes means on said enclosure for adjusting the thickness of said fresh water insulating layer.

30. A system as defined in claim 21, which includes a forebay having a lower sea water zone and an upper brackish water zone, and having respective sea water and brackish water inlets to said zones, means connecting said forebay sea water zone with said enclosure to provide a sea water component to said body of water, fresh water inlet means in said enclosure providing a fresh water component to said body of water, means for mixing said sea water and fresh water components in said body of water so that said body of water is principally brackish water, and brackish water outlet means in said enclosure providing brackish water to said forebay brackish water inlet.

31. A system as defined in claim 30, which includes fresh water inlet means to said forebay proximate the upper boundary of said brackish zone of the forebay for flowing a discrete fresh water insulating layer on top of the brackish water in the forebay so as to raise the temperature in the forebay.

32. A system as defined in claim 21, wherein said body of water is divided into a sink region and a main rearing area by a barrier that is at least in part foraminous, and sea water inlet means proximate the bottom of said sink region to provide a flow of sea water upwardly in said sink region and thence through said barrier and into said main rearing area; water oultet means on said enclosure and generally isolated from said upwardly flowing sea water for outflow from proximate the surface of the body of water, said carnivorous species comprising a carnivorous crustacean species located in said main rearing area, and said filter-feeding species comprising bivalve species located at least in part in said sink region.

33. A system for the aquaculture of a carnivorous aquatic non-air breathing species which comprises an enclosure having a body of water therein, an aqueous euphotic zone containing phytoplankton in said body of water above an aqueous botton zone, respective downflow and upflow mixing chimneys remotely spaced from each other in said body of water, sea water inlet means for introducing sea water into said downflow mixing chimney to cause mixing of sea water with water from said euphotic zone to provide brackish water and disposition of same in said lower zone, fresh water inlet means for introducing fresh water into said upflow mixing chamber to cause mixing of fresh water with brackish water from said lower zone and disposition of the resulting mixture in said euphotic zone, whereby brackish water in said bottom zone is caused to move generally in the direction from said downflow chimney toward said upflow chimney, and water in said euphotic zone is caused to move generally in the direction from said upflow chimney toward said downflow chimney, and means for removing water from the euphotic zone near the surface thereof at a position remote from said upflow chimney.

* * * * *